United States Patent
Jiang et al.

(10) Patent No.: US 11,412,454 B2
(45) Date of Patent: Aug. 9, 2022

(54) TRANSMISSION MODE DETERMINATION METHODS AND DEVICES

(71) Applicant: VIVO MOBILE COMMUNICATION CO., LTD., Guangdong (CN)

(72) Inventors: Dajie Jiang, Chang'an Dongguan (CN); Xueming Pan, Chang'an Dongguan (CN); Kai Wu, Chang'an Dongguan (CN); Fei Qin, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 17/033,275

(22) Filed: Sep. 25, 2020

(65) Prior Publication Data
US 2021/0014794 A1 Jan. 14, 2021

Related U.S. Application Data

(63) Continuation of application No. PCT/CN2019/077794, filed on Mar. 12, 2019.

(30) Foreign Application Priority Data

Mar. 30, 2018 (CN) .......................... 201810276377.8

(51) Int. Cl.
*H04W 52/02* (2009.01)
*H04W 76/27* (2018.01)
(Continued)

(52) U.S. Cl.
CPC ...... *H04W 52/0274* (2013.01); *H04B 7/0486* (2013.01); *H04B 7/0632* (2013.01);
(Continued)

(58) Field of Classification Search
CPC ............. H04W 52/0274; H04W 76/27; H04W 52/0229; H04W 80/02; H04W 52/0225;
(Continued)

(56) References Cited

U.S. PATENT DOCUMENTS

2007/0281746 A1 12/2007 Takano et al.
2012/0170533 A1 7/2012 Ahn et al.
(Continued)

FOREIGN PATENT DOCUMENTS

CN 102811079 A 12/2012
CN 106376016 A 2/2017
(Continued)

OTHER PUBLICATIONS

CN Office Action in Application No. 201810276377.8 dated Aug. 4, 2020.
(Continued)

*Primary Examiner* — Afshawn M Towfighi
(74) *Attorney, Agent, or Firm* — Maschoff Brennan

(57) ABSTRACT

The present disclosure provides in some embodiments a transmission mode determination method and a transmission mode determination device. The transmission mode determination method includes transmitting change information to a network side device, and the change information is used to indicate a desired transmission mode of a UE.

20 Claims, 8 Drawing Sheets

(51) Int. Cl.
*H04B 7/0456* (2017.01)
*H04B 7/06* (2006.01)
*H04W 80/02* (2009.01)

(52) U.S. Cl.
CPC ...... *H04B 7/0639* (2013.01); *H04W 52/0229* (2013.01); *H04W 76/27* (2018.02); *H04W 80/02* (2013.01)

(58) Field of Classification Search
CPC ............ H04W 52/0258; H04B 7/0486; H04B 7/0632; H04B 7/0639; H04B 7/0608; H04B 7/0814; H04B 7/0689; H04L 5/0023; H04L 5/0053; Y02D 30/70
See application file for complete search history.

(56) References Cited

U.S. PATENT DOCUMENTS

| | | | |
|---|---|---|---|
| 2013/0083757 A1 | 4/2013 | Kakishima et al. | |
| 2014/0044207 A1 | 2/2014 | Han | |
| 2014/0313997 A1 | 10/2014 | Xu et al. | |
| 2015/0131461 A1 | 5/2015 | Ramkumar et al. | |
| 2017/0041869 A1* | 2/2017 | Homchaudhuri | H04W 52/028 |
| 2018/0124746 A1* | 5/2018 | Choi | H04L 5/0044 |
| 2018/0262259 A1 | 9/2018 | Sano et al. | |
| 2019/0036673 A1* | 1/2019 | Chen | H04L 5/0064 |
| 2019/0045575 A1* | 2/2019 | Huang | H04W 76/10 |
| 2019/0104469 A1 | 4/2019 | Ge | |
| 2020/0274678 A1* | 8/2020 | Lin | H04W 72/10 |
| 2020/0367279 A1* | 11/2020 | Lin | H04L 1/1887 |

FOREIGN PATENT DOCUMENTS

| | | |
|---|---|---|
| CN | 107046714 A | 8/2017 |
| CN | 107493597 A | 12/2017 |
| JP | 2000341290 A | 12/2000 |
| JP | 2004007601 A | 1/2004 |
| JP | 2008092433 A | 4/2008 |
| JP | 2011234298 A | 11/2011 |
| JP | 2013058876 A | 3/2013 |
| KR | 20110027591 A | 3/2011 |
| WO | 2009012713 A1 | 1/2009 |
| WO | 2017014557 A1 | 1/2017 |
| WO | 2017033807 A1 | 3/2017 |
| WO | 2017034081 A1 | 3/2017 |

OTHER PUBLICATIONS

Written Opinion and International Search Report in Application No. PCT/CN2019/077794 dated Oct. 15, 2020.
EP Search Report in Application No. 19777738.6 dated Mar. 30, 2021.
KR Office Action in Application No. 10-2020-7029792 dated Apr. 22, 2021.
IN Office Action in Application No. 202027045231 dated Sep. 10, 2021.
JP Office Action in Application No. 2020-552719 dated Nov. 17, 2021.
"Remaining details of new UE category for low cost MTC" 3GPP TSG RAN WG1 Meeting $74bis, R1-135356, ZTE, Nov. 11, 2013.
"Antenna selection transmission for PUSCH" 3GPP TSG RAN WG1 NR Ad Hoc Meeting$4, R1-1800909, Huawei, HiSilicon, Jan. 22, 2018.

* cited by examiner

S101: transmitting change information to a network side device, the change information being used to indicate a desired transmission mode of a UE

FIG. 1

TRANSMISSION MODE DETERMINATION METHODS AND DEVICES

CROSS-REFERENCE TO RELATED APPLICATION

The present application is a continuation application of PCT Application No. PCT/CN2019/077794 filed on Mar. 12, 2019, which claims a priority of the Chinese patent application No. 201810276377.8 filed on Mar. 30, 2018, which are incorporated herein by reference in their entirety.

TECHNICAL FIELD

The present disclosure relates to the field of mobile communications, in particular to transmission mode determination methods and transmission mode determination devices.

BACKGROUND

Currently, along with the rapid development of mobile communications technology, a fifth-generation (Fifth-Generation, 5G) mobile communications system is capable of being adapted to more diversified scenarios and service requirements, so the 5G system has been applied more and more widely. In the 5G system, with respect to different application scenarios, a user equipment (User Equipment, UE) may support services with different numerologies, e.g., the UE may support an ultra reliable & low latency communication (Ultra Reliable & Low Latency Communication, URLLC) service and a high-capacity high-speed enhanced mobile broadband (Enhanced Mobile Broadband, eMBB) service.

For the UE that supports various services, in order to ensure data transmission performance of the system, in the 5G system, the UE is required to support four reception antennae or two transmission antennae when it operates at a predetermined frequency band. In the case that downlink information includes small data packets, it is able to meet a quality of service (Quality of Service, QoS) requirement through two reception antennae. At this time, when the downlink information is still received by the UE through four antennae, unnecessary power consumption may occur for the UE, and it is adverse to the power saving of the UE. Identically, in the case that uplink information includes small data packets, it is able to meet the QoS requirement through one antenna. At this time, when the uplink information is still transmitted by the UE through two antennae, unnecessary power consumption may occur for the UE, and it is adverse to the power saving of the UE as well.

Currently, in order to reduce the unnecessary power consumption for the UE, the UE may directly change a transmission mode according to the practical need, e.g., change the number of actually-used reception antennae, i.e., change the number of reception antennae from four to two. At this time, when a network side device needs to receive the downlink information through four antennae for downlink scheduling and it is impossible to meet the QoS requirement when two reception antennae are used by the UE, system downlink performance may be deteriorated, e.g., a system block error rate (Block Error Rate, BLER) may increase.

Based on the above, in the 5G system, when the UE is maintained in a transmission mode with four reception antennae or two transmission antennae, unnecessary power consumption may occur for the UE, and it is adverse to the power saving of the UE. In addition, when the transmission mode is changed by the UE on its own initiative, data transmission performance of the system may deteriorate.

SUMMARY

In a first aspect, the present disclosure provides in some embodiments a transmission mode determination method for a UE, including: transmitting change information to a network side device. The change information is used to indicate a desired transmission mode of the UE, and the desired transmission mode includes at least one of the number of reception antennae, the number of transmission antennae, the number of reception antenna ports, the number of transmission antenna ports, the number of reception chains, the number of transmission chains, the maximum layers of downlink and the maximum layers of uplink, and values thereof.

In a second aspect, the present disclosure provides in some embodiments a transmission mode determination method for a UE, including: receiving a target transmission mode from a network side device; and setting the target transmission mode as a current transmission mode.

In a third aspect, the present disclosure provides in some embodiments a transmission mode determination method for a network side device, including: receiving change information from a UE. The change information is used to indicate a desired transmission mode of the UE, and the desired transmission mode includes at least one of the number of reception antennae, the number of transmission antennae, the number of reception antenna ports, the number of transmission antenna ports, the number of reception chains, the number of transmission chains, the maximum layers of downlink and the maximum layers of uplink, and values thereof.

In a fourth aspect, the present disclosure provides in some embodiments a transmission mode determination method for a network side device, including: transmitting a target transmission mode to a UE, so that the UE sets the target transmission mode as a current transmission mode.

In a fifth aspect, the present disclosure provides in some embodiments a UE, including a first transmission module configured to transmit change information to a network side device. The change information is used to indicate a desired transmission mode of the UE, and the desired transmission mode includes at least one of the number of reception antennae, the number of transmission antennae, the number of reception antenna ports, the number of transmission antenna ports, the number of reception chains, the number of transmission chains, the maximum layers of downlink and the maximum layers of uplink, and values thereof.

In a sixth aspect, the present disclosure provides in some embodiments a UE, including: a first reception module configured to receive a target transmission mode from a network side device; and a transmission mode setting module configured to set the target transmission mode as a current transmission mode.

In a seventh aspect, the present disclosure provides in some embodiments a network side device, including: a second reception module configured to receive change information from a UE. The change information is used to indicate a desired transmission mode of the UE, and the desired transmission mode includes at least one of the number of reception antennae, the number of transmission antennae, the number of reception antenna ports, the number of transmission antenna ports, the number of reception chains, the number of transmission chains, the maximum layers of downlink and the maximum layers of uplink, and values thereof.

In an eighth aspect, the present disclosure provides in some embodiments a network side device, including: a second transmission module configured to transmit a target transmission mode to a UE, so that the UE sets the target transmission mode as a current transmission mode.

In a ninth aspect, the present disclosure provides in some embodiments a UE, including a memory, a processor, and a computer program stored in the memory and executed by the processor. The processor is configured to execute the computer program so as to implement the method mentioned in the first aspect.

In a tenth aspect, the present disclosure provides in some embodiments a UE, including a memory, a processor, and a computer program stored in the memory and executed by the processor. The processor is configured to execute the computer program so as to implement the method mentioned in the second aspect.

In an eleventh aspect, the present disclosure provides in some embodiments a network side device, including a memory, a processor, and a computer program stored in the memory and executed by the processor. The processor is configured to execute the computer program so as to implement the method mentioned in the third aspect.

In a twelfth aspect, the present disclosure provides in some embodiments a network side device, including a memory, a processor, and a computer program stored in the memory and executed by the processor. The processor is configured to execute the computer program so as to implement the method mentioned in the fourth aspect.

In a thirteenth aspect, the present disclosure provides in some embodiments a computer-readable storage medium storing therein a computer program. The computer program is executed by the processor so as to implement the method mentioned in the first aspect, or the method mentioned in the second aspect, or the method mentioned in the third aspect, or the method mentioned in the fourth aspect.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

FIG. 1 is a flow chart of a transmission mode determination method for a UE according to one embodiment of the present disclosure;

DETAILED DESCRIPTION

Figure 2:
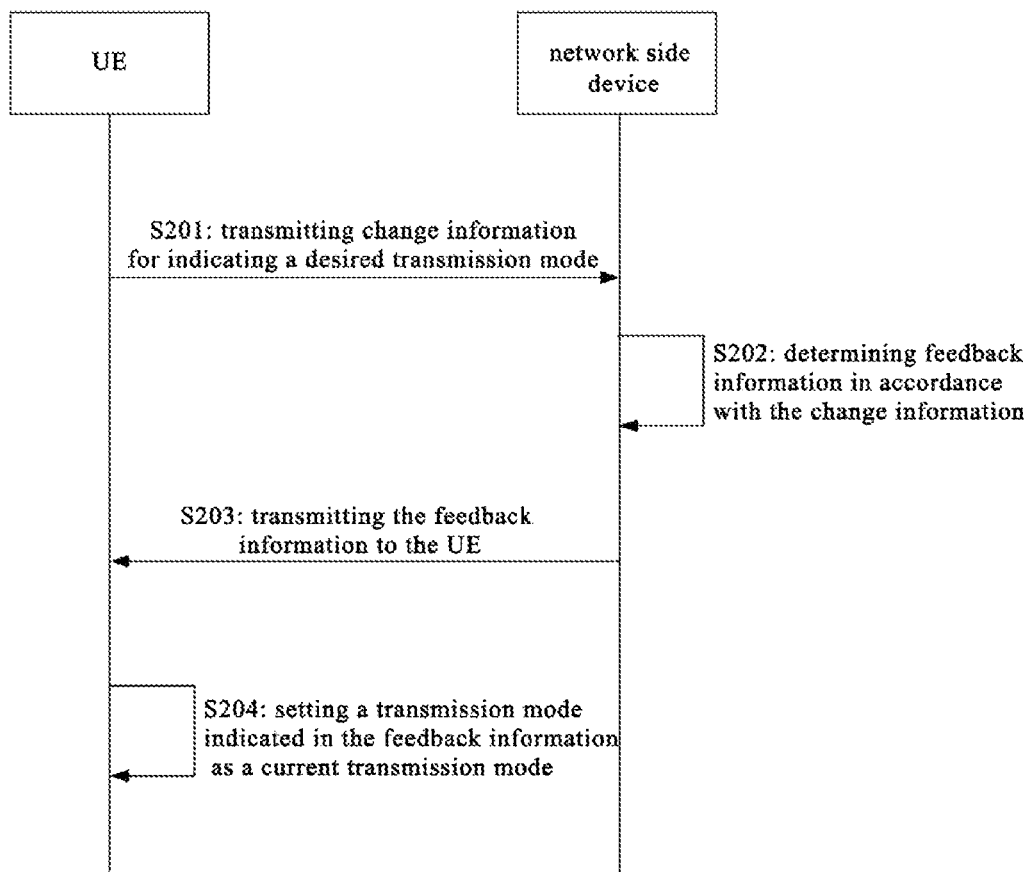
FIG. 2 is a schematic view showing the transmission mode determination method according to one embodiment of the present disclosure.

In order to make the objects, the technical solutions and the advantages of the present disclosure more apparent, the present disclosure will be described hereinafter in a clear manner in conjunction with the drawings and embodiments. Obviously, the following embodiments merely relate to a part of, rather than all of, the embodiments of the present disclosure, and based on these embodiments, a person skilled in the art may obtain the other embodiments, which also fall within the scope of the present disclosure. The expression "and/or" involved in the description and the appended claims represents at least one of listed items.

Schemes in the embodiments of the present disclosure may be applied to various communications systems, e.g., global system of mobile communication (Global System of Mobile communication, GSM), code division multiple access (Code Division Multiple Access, CDMA) system, wideband code division multiple access (Wideband Code Division Multiple Access, WCDMA), general packet radio service (General Packet Radio Service, GPRS), long term evolution (Long Term Evolution, LTE)/long term evolution advanced (Long Term Evolution advanced, LTE-A), or new radio (New Radio, NR).

A UE, also called as user terminal, mobile terminal or mobile user device, may communicate with one or more core networks through a radio access network (Radio Access Network, RAN). The UE may be a mobile terminal, e.g., a mobile phone (or cellular phone), and a computer having a mobile terminal, e.g., a portable, pocket-sized, handheld, built-in or vehicle-mounted mobile device which exchanges voice and/or data with the RAN.

A network side device may communicate with the UE, and it may be a base transceiver station (Base Transceiver Station, BTS) in GSM or CDMA, a Node B in WCDMA, an evolutional Node B (eNB or e-Node B) in LTE, or a 5G base station (gNB), which will not be particularly repeated herein. For ease of description, the gNB will be taken as an example hereinafter.

The following terms will be involved in the embodiments of the present disclosure: bandwidth part (Bandwidth Part, BWP), channel quality indicator (Channel Quality Indicator, CQI), rank indication (Rank Indication, RI), precoding matrix indicator (Precoding Matrix Indicator, PMI), layer indication (Layer Indication, LI), multiple-input multiple-output (Multiple-Input Multiple-Output, MIMO), downlink control information (Downlink Control Information, DCI), medium access control CE (Medium Access Control CE, MAC CE), radio resource control (Radio Resource Control, RRC), wake up signal (Wake Up Signal, WUS), and modulation and coding scheme (Modulation and Coding Scheme, MCS).

The present disclosure provides in some embodiments a transmission mode determination method a transmission mode determination device for a 5G system, which will be described hereinafter in more details in conjunction with the embodiments.

The present disclosure provides in some embodiments a transmission mode determination method for a UE which, as shown in FIG. 1, includes S101 of transmitting change information to a network side device. The change information is used to indicate a desired transmission mode of the UE, and the desired transmission mode includes at least one of the number of reception antennae, the number of transmission antennae, the number of reception antenna ports, the number of transmission antenna ports, the number of reception chains, the number of transmission chains, the maximum layers of downlink and the maximum layers of uplink, and values thereof.

After the UE determines that it is necessary to change a transmission mode, it may transmit the change information for requesting the change of the transmission mode to a network side device. The change information may be information not carrying the desired transmission mode, or information for indicating the desired transmission mode, i.e., information carrying the desired transmission mode determined by the UE. During the implementation, in order to enable the network side device to rapidly determine the transmission mode to which the UE wants to be switched, in a possible embodiment of the present disclosure, the change information may be used to indicate the desired transmission mode of the UE, and when the desired transmission mode is different from a current transmission mode of the UE, the UE may transmit the change information to the network side device.

According to the embodiments of the present disclosure, the UE may transmit the change information for requesting the change of the transmission mode to the network side device, so that the network side device determines the transmission mode capable of being executed currently by the UE in accordance with the change information. As a result, it is able to, on one hand, change the transmission mode of the UE accurately, reduce the unnecessary power consumption for the UE and achieve a power-saving effect, and on the other hand, ensure the data transmission performance of a system.

The transmission mode may be associated with a serving cell, or with a target BWP of the serving cell. To be specific, the change information may be used to request the change of a transmission mode with respect to the serving cell or a transmission mode with respect to one or more target BWPs. The transmission modes for different BWPs may be different from each other.

Taking the number of reception antenna ports as an example, the number of reception antenna ports may be two or four. In the case that the data reception performance is highly required for a downlink service type, the UE needs to use four reception antenna ports to receive downlink data from the network side device (i.e., in the transmission mode involving the number of reception antennae, there are four reception antenna ports), and in the case that the data reception performance is not highly required for the downlink service type, the UE may use two reception antenna ports to receive the downlink data from the network side device (i.e., in the transmission mode involving the number of reception antennae, there are two reception antenna ports). When it is necessary to switch between the transmission mode with four reception antenna ports and the transmission mode with two reception antenna ports, the UE may transmit the desired number of reception antenna ports to the network side device, so that the network side device determines, in a comprehensive manner, whether the UE is capable of being switched to the transmission mode with the desired number of reception antenna ports.

For ease of description, the following description will be given by taking the number of reception antennae as an example, where "four Rx" represents that the number of reception antennae is four, and "two Rx" represents that the number of reception antennae is two. In addition, the other parameters indicating the transmission mode may be determined in a same way. Taking the number of reception antennae as an example, when 0 represents "two Rx", 1 represents "four Rx", and the change information from the UE carries 0, it means that the desired number of reception antennae for the UE may be two. Alternatively, taking the number of transmission antennae as an example, when 0 represents "one Tx", 1 represents "two Tx" and the change information from the UE carries 0, it means that the desired number of transmission antennae for the UE may be one. Alternatively, reception-transmission joint coding, e.g., one bit, may be adopted, and when 0 represents "two Rx" and "one Tx", 1 represents "four Rx" and "two Tx", and the change information from the UE carries 0, it means that the desired number of reception antennae may be two and the desired number of transmission antennae may be one. Here, the number of reception antennae may be replaced with any one of the number of transmission antennae, the number of reception antenna ports, the number of transmission antenna ports, the number of reception chains, the number of transmission chains, the maximum layers of downlink and the maximum layers of uplink.

During the implementation, upon the receipt of the change information from the UE, the network side device may transmit corresponding feedback information to the UE in accordance with the change information, so as to notify the UE of the transmission mode capable of being executed currently. At this time, upon the receipt of the feedback information, the UE may change the transmission mode in accordance with the feedback information. As shown in FIG. 2, the following steps will be performed.

S201: transmitting, by the UE, the change information for indicating the desired transmission mode.

S202: determining, by the network side device, the feedback information in accordance with the change information. The feedback information may be used to indicate whether the desired transmission mode is allowed, or indicate a target transmission mode. To be specific, the target transmission mode may be determined by the network side device in accordance with transmission mode influencing factors. The target transmission mode may be the same as, or different from, the desired transmission mode.

S203: transmitting, by the network side device, the feedback information to the UE, so that the UE receives the feedback information and changes the transmission mode in accordance with the feedback information.

S204: upon the receipt of the feedback information, setting, by the UE, the transmission mode indicated in the feedback information as a current transmission mode.

To be specific, in S204, the transmission mode indicated in the feedback information may be set as the current transmission mode in the following ways.

When the feedback information is used to indicate whether the desired transmission mode is allowed, there may exist the following two circumstances.

(1) When the feedback information indicates that the desired transmission mode is allowed, the desired transmission mode may be set as the current transmission mode. To be specific, the network side device may determine, in a comprehensive manner, that the UE is currently capable of using the desired transmission mode to receive downlink data or transmit uplink data. At this time, the network side device may transmit information representing that the desired transmission mode is allowed to the UE, e.g., 0 represents that the desired transmission mode is allowed and 1 represents that the desired transmission mode is not allowed. Upon the receipt of the feedback information carrying 0, the desired transmission mode may be set as the current transmission mode.

(2) When the feedback information indicates that the desired transmission mode is not allowed, the UE may be maintained in the current transmission mode. To be specific, the network side device may determine, in a comprehensive manner, that the UE currently needs to use an original transmission mode to receive the downlink data or transmit the uplink data. At this time, the network side device may transmit information representing that the desired transmission mode is not allowed to the UE, e.g., 0 represents that the desired transmission mode is allowed and 1 represents that the desired transmission mode is not allowed. Upon the receipt of the feedback information carrying 1, the UE may be continuously maintained in the current transmission mode.

The network side device may determine, o a comprehensive manner, the transmission mode capable of being currently executed by the UE in accordance with a plurality of transmission mode influencing factors. When the determined transmission mode is the same as the current transmission mode of the UE, the network side device may transmit the feedback information for indicating that the desired transmission mode is not allowed to the UE. Upon the receipt of the feedback information, the UE may be continuously maintained in the current transmission mode.

For example, when the number of reception antennae for the UE is four (i.e., four Rx), the UE may determine that the desired number of reception antennae is two (i.e., two Rx) in accordance with its own attributes (e.g., a heating state), but the network side device may determine that the number of reception antennae to be used by the UE is four in accordance with attributes of downlink services. At this time, the feedback information transmitted by the network side device may indicate that the desired transmission mode is not allowed.

When the feedback information is used to indicate the target transmission mode, there may also exist the following circumstances.

(1) When the feedback information indicates the target transmission mode different from the current transmission mode, the target transmission mode may be set as the current transmission mode. The target transmission mode may be the same as, or different from, the desired transmission mode.

(2) When the feedback information indicates the target transmission mode which is the same as the current transmission mode, the UE may be maintained in the current transmission mode. When the target transmission mode is the same as the current transmission mode, the network side device may transmit, or may not transmit, the feedback information to the UE. During the implementation, in order to enable the UE to know that the change information has been received by the network side device but the UE is not allowed to change the transmission mode in accordance with the change information, in a possible embodiment of the present disclosure, even when the target transmission mode determined by the network side device is the same as the current transmission mode, the feedback transmission may also be transmitted to the UE.

Figure 3:
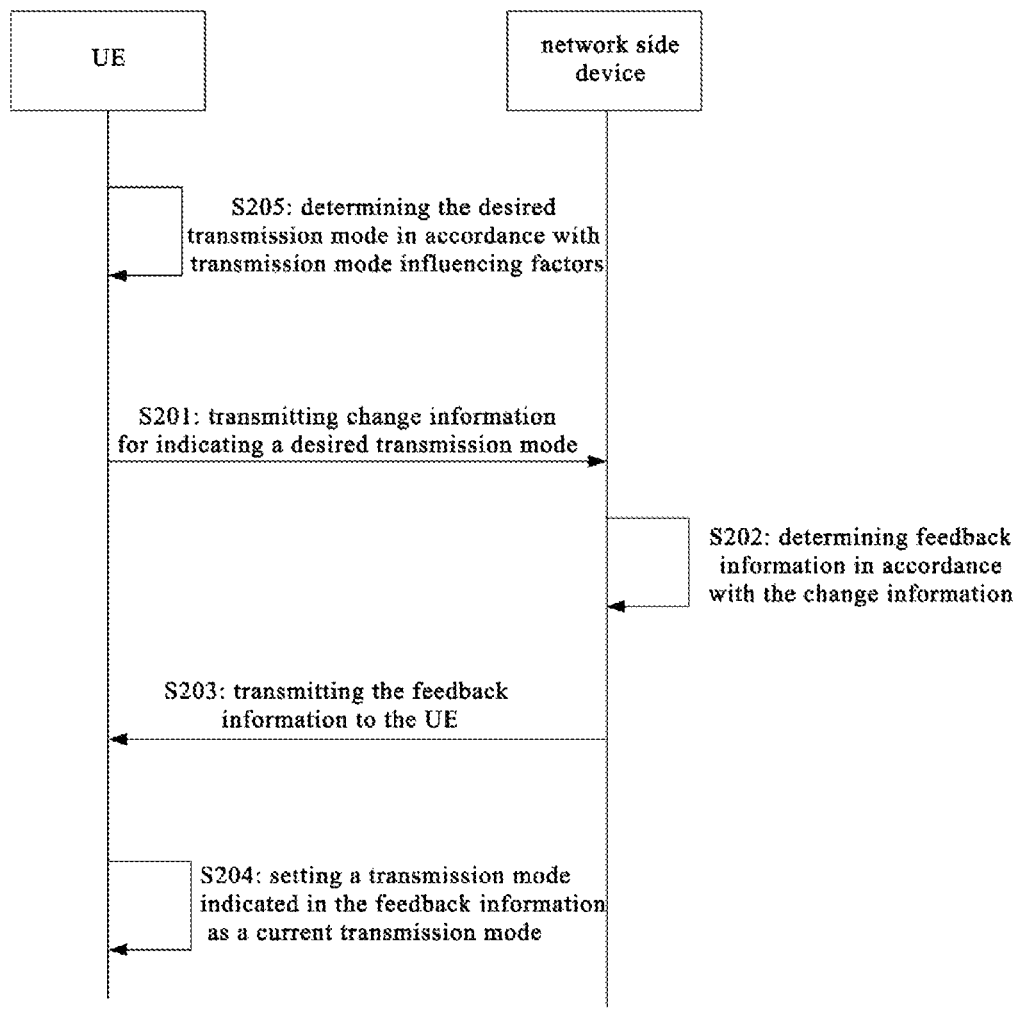
FIG. 3 is another schematic view showing the transmission mode determination method according to one embodiment of the present disclosure.

To be specific, prior to transmitting the change information to the network side device, the UE needs to determine its own desired transmission mode. As shown in FIG. 3, prior to S201 of transmitting, by the UE, the change information for indicating the desired transmission mode, the method may further include S205 of determining the desired transmission mode in accordance with the transmission mode influencing factors. The transmission mode influencing factors may include at least one of a remaining battery of the UE, an overheating indication of the UE, an attribute of an uplink service, and an attribute of a downlink service. To be specific, parameters of the transmission mode related to uplink transmission (e.g., the number of transmission antennae and the maximum layers of uplink) and values thereof may be affected by the attribute of the uplink service, and parameters of the transmission mode related to downlink transmission (e.g., the number of reception antennae and the maximum layers of downlink) and values thereof may be affected by the attribute of the downlink service.

The desired transmission mode may be determined in accordance with one or more of the transmission mode influencing factors. In the case that a plurality of influencing factors has been introduced, i.e., in the case that the number of transmission mode influencing factors is plural, a final desired transmission mode may be determined in accordance with an initial desired transmission mode corresponding to each influencing factor. During the implementation, each transmission mode influencing factor may be provided with a priority level in advance, and a desired transmission mode corresponding to the influencing factor with a highest priority level as the final transmission mode.

In addition, a predetermined determination condition may be provided, and the final desired transmission mode may be determined in accordance with the desired transmission mode corresponding to each influencing factor and the predetermined determination condition. For example, the predetermined determination condition may be that, when a predetermined number of influencing factors corresponds to a same desired transmission mode, the desired transmission mode is set as the final desired transmission mode. For example, when the desired number of reception antennae corresponding to two of three influencing factors is two, the final desired number of reception antennae may be determined as two. During the implementation, a way for determining the final desired transmission mode may be set according to the practical need.

With respect to each transmission mode influencing factor, a procedure of determining the desired transmission mode will be described as follows.

(1) With respect to the remaining battery of the UE, a correspondence between remaining capacities and transmission modes may be preset, and then the desired transmission mode may be determined in accordance with a current remaining battery of the UE.

For example, still taking the number of reception antennae as an example, when the number of reception antennae is two or four, in the predetermined correspondence, the remaining battery that is smaller than or equal to a predetermined capacity threshold may correspond to two reception antennae, and the remaining battery that is greater than the predetermined capacity threshold may correspond to four reception antennae.

Hence, when the current remaining battery of the UE is smaller than or equal to a first predetermined capacity threshold (e.g., 10%, which may be set according to the practical need) and the current number of reception antennae for the UE is four (i.e., four Rx), the desired number of reception antennae may be two (i.e., two Rx).

When the current remaining battery of the UE is greater than or equal to a second predetermined capacity threshold (e.g., 20%, which may be set according to the practical need) and the current number of reception antennae for the UE is two (i.e., two Rx), the desired number of reception antennae may be four (i.e., four Rx).

(2) With respect to the heating state of the UE, a correspondence between actually-measured temperatures and transmission modes may be preset, and then the desired transmission mode may be determined in accordance with the actually-measured temperature of the UE.

For example, still taking the number of reception antennae as an example, when the number of reception antennae is two or four, in the predetermined correspondence, the actually-measured temperature that is smaller than or equal to a predetermined temperature threshold may correspond to two reception antennae, and the actually-measured temperature that is greater than the predetermined temperature threshold may correspond to four reception antennae.

Hence, when the actually-measured temperature of the UE is greater than a first predetermined temperature threshold (e.g., 40° C., which may be set according to the practical need) and the current number of reception antennae for the UE is four (i.e., four Rx), the desired number of reception antennae may be two (i.e., two Rx).

When the actually-measured temperature of the UE is smaller than or equal to a second predetermined temperature threshold (e.g., 40° C., which may be set according to the practical need) and the current number of reception antennae for the UE is two (i.e., two Rx), the desired number of reception antennae may be four (i.e., four Rx).

(3) With respect to the attribute of the downlink service, a correspondence between attributes of the downlink service and transmission modes may be preset, and then the desired transmission mode may be determined in accordance with the attribute of the downlink service. The attribute of the downlink service may affect parameters of the transmission mode related to the downlink transmission, e.g., the number of reception antennae and the maximum layers of downlink, and values thereof.

For example, still taking the number of reception antennae as an example, when the number of reception antennae is two or four, in the predetermined correspondence, the attribute of the downlink service that is a first predetermined service attribute may correspond to two reception antennae, and the attribute of the downlink service that is a second predetermined service attribute may correspond to four reception antennae.

Hence, when the attribute of the downlink service is the first predetermined service attribute and the current number of reception antennae for the UE is four (i.e., four Rx), the desired number of reception antennae may be two (i.e., two Rx).

When the attribute of the downlink service is the second predetermined service attribute and the current number of reception antennae for the UE is two (i.e., two Rx), the desired number of reception antennae may be four (i.e., four Rx).

(4) With respect to the attribute of the uplink service, a correspondence between attributes of the uplink service and transmission modes may be preset, and then the desired transmission mode may be determined in accordance with the attribute of the uplink service. The attribute of the uplink service may affect parameters of the transmission mode related to the uplink transmission, e.g., the number of transmission antennae and the maximum layers of uplink, and values thereof.

For example, taking the number of transmission antennae as an example, when the number of transmission antennae is one or two, in the predetermined correspondence, the attribute of the uplink service that is a third predetermined service attribute may correspond to one transmission antenna, and the attribute of the uplink service that is a fourth predetermined service attribute may correspond to two transmission antennae.

Hence, when the attribute of the uplink service is the third predetermined service attribute and the current number of transmission antennae for the UE is two (i.e., two Tx), the desired number of transmission antennae may be one (i.e., one Tx).

When the attribute of the uplink service is the fourth predetermined service attribute and the current number of transmission antennae for the UE is one (i.e., one Tx), the desired number of transmission antennae may be two (i.e., two Tx).

Further, the UE may transmit at least one of the remaining battery of the UE, the overheating indication of the UE, the attribute of the uplink service and the attribute of the downlink service to the network side device as the transmission mode influencing factors for determining the feedback information.

After the transmission mode has been set in accordance with the feedback information from the network side device, the UE may perform data transmission and report channel-related parameters in accordance with the transmission mode indicated in the feedback information. To be specific, upon the receipt of the feedback information, the UE may report the channel-related parameters to the network side device in accordance with the transmission mode indicated in the feedback information. The channel-related parameters may include at least one of CQI, RI, PMI and LI.

The current transmission mode of the UE may set in accordance with a feedback indication from the network side device. When a transmission mode corresponding to the received scheduling signaling is different from the current transmission mode and the UE needs to execute the scheduling signaling in response to the scheduling from the network side device after the change of the transmission mode, there may exist a processing delay for the change of the transmission mode. Hence, the UE may select to be maintained in the current transmission mode, and ignore the scheduling from the network side device. To be specific, after the transmission mode indicated in the feedback information has been set as the current transmission mode, when the transmission mode corresponding to the scheduling signaling transmitted by the network side device is different from the transmission mode indicated in the feedback information, the UE may ignore the scheduling signaling from the network side device. The scheduling signaling may include signaling for scheduling downlink data or signaling for scheduling uplink data.

For example, the current transmission mode of the UE may include two reception antenna ports, and a downlink PMI indicated in the scheduling signaling from the network side device may be based on through four reception antenna ports, or a downlink RI indicated in the scheduling signaling may be greater than two or a downlink LI indicated in the scheduling signaling may be greater than two. At this time, it is impossible to execute the scheduling signaling from the network side device in the current transmission mode, so the UE may ignore, i.e., not execute, the scheduling signaling from the network side device. At this time, the UE may transmit a negative acknowledgement (Negative Acknowledgement, NACK) to the network side device.

For another example, the current transmission mode of the UE may include one transmission antenna port, and an uplink PMI indicated in the scheduling signaling from the network side device may be based on through two reception antenna ports, or an uplink RI indicated in the scheduling signaling may be two or an uplink LI indicated in the scheduling signaling may be two. At this time, it is impossible to execute the scheduling signaling from the network side device in the current transmission mode, so the UE may ignore, i.e., not execute, the scheduling signaling from the network side device. At this time, the UE may not transmit the uplink data in accordance with an indication in the scheduling signaling.

To be specific, the feedback information may be transmitted by the network side device to the UE through one or more of physical layer signaling, MAC signaling, RRC signaling and a WUS.

Figure 4:
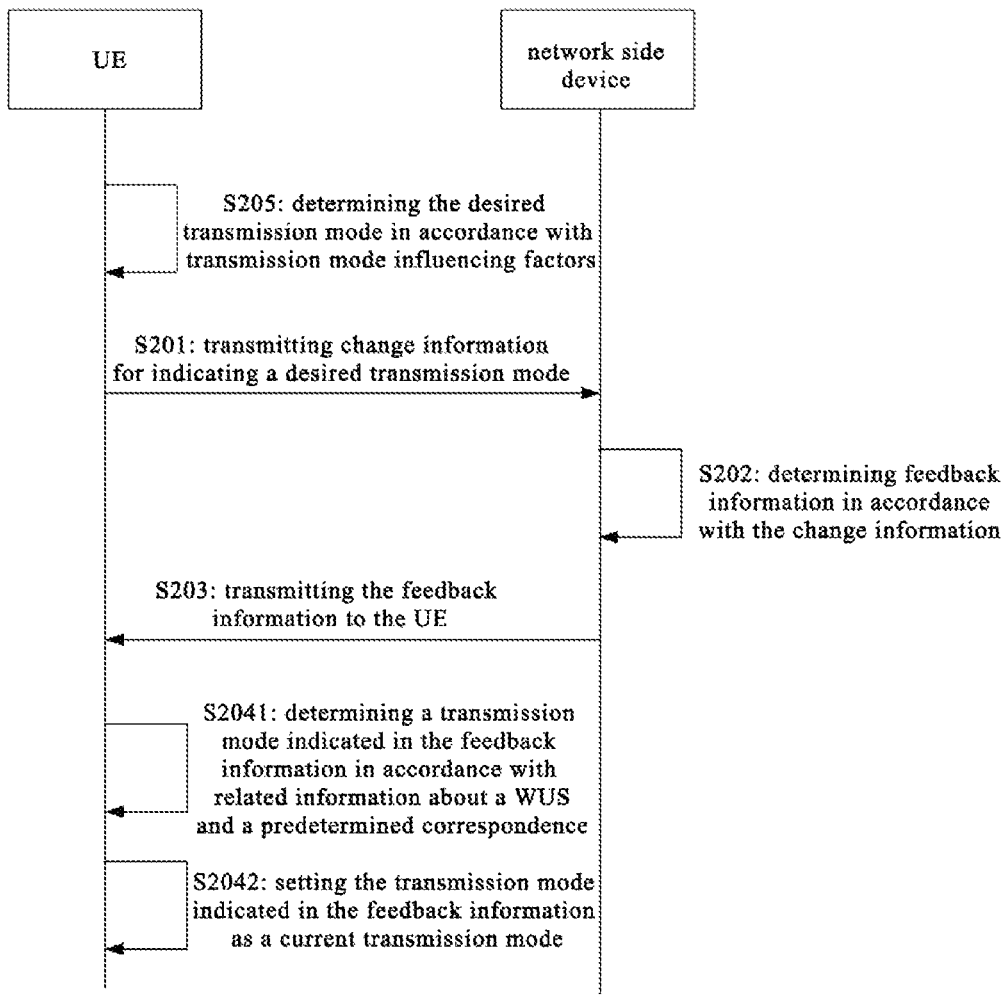
FIG. 4 is yet another schematic view showing the transmission mode determination method according to one embodiment of the present disclosure.

When the feedback information is transmitted through the WUS, as shown in FIG. 4, S204 of setting the transmission mode indicated in the feedback information as the current transmission mode may include: S2041 of determining the transmission mode indicated in the feedback information in accordance with related information about the WUS and a predetermined correspondence, the predetermined correspondence including a correspondence between the related information about the WUS and transmission modes; and S2042 of setting the transmission mode indicated in the feedback information as the current transmission mode. The transmission mode indicated in the feedback information may be the same as, or different from, the desired transmission mode.

To be specific, the related information about the WUS may include at least one of an orthogonal cover code of a sequence of the WUS, a cyclic shift of the sequence of the WUS, a root sequence of the sequence of the WUS, and a scrambled sequence of the sequence of the WUS.

The WUS may be a sequence, and elements of the sequence may include the orthogonal cover code, the cyclic shift, the root sequence and the scrambled sequence. The WUSs, i.e., the sequences, including different elements may be different from each other. During the implementation, a correspondence between elements of sequences of WUSs and transmission modes may be pre-stored. Taking the orthogonal cover code of the sequence as an example, the orthogonal cover codes of two sequences may be used to indicate different transmission modes. For example, an orthogonal cover code 1 may indicate that the number of reception antennae is two (two Rx), and an orthogonal cover code 2 may indicate that the number of reception antennae is four (four Rx).

Correspondingly, when the orthogonal cover code of the sequence of the received WUS is an orthogonal cover code 1, the transmission mode indicated in the feedback information may include two reception antennae (two Rx), and at this time, the UE may set the current number of reception antennae as two.

According to the transmission mode determination method in the embodiments of the present disclosure, the change information indicating the desired transmission mode of the UE may be transmitted to the network side device. In the embodiments of the present disclosure, the UE may transmit the change information for requesting the change of the transmission mode to the network side device, so that the network side device determines the transmission mode capable of being executed currently by the UE in accordance with the change information. As a result, it is able to, on one hand, change the transmission mode of the UE accurately, reduce the unnecessary power consumption for the UE and achieve a power-saving effect, and on the other hand, ensure the data transmission performance of a system.

Correspondingly, the present disclosure further provides in some embodiments a transmission mode determination method for a UE. Contents identical to those mentioned hereinabove will not be particularly repeated herein.

Figure 5:
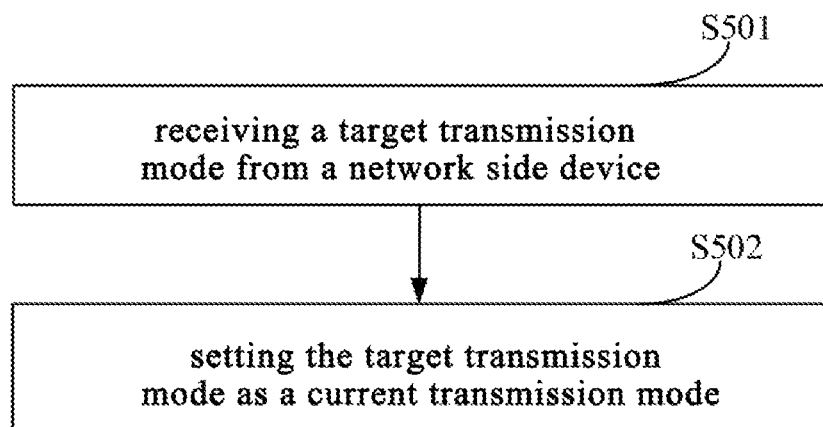
FIG. 5 is a flow chart of a transmission mode determination method for the UE according to one embodiment of the present disclosure.

As shown in FIG. 5, the transmission mode determination method includes the following steps.

S501: receiving a target transmission mode from a network side device. In the case that no change request is transmitted by the UE, the network side device may transmit, on its own initiative, the target transmission mode to the UE when the UE needs to change its transmission mode.

S502: setting the target transmission mode from the network side device as a current transmission mode. To be specific, the network side device may indicate the target transmission mode explicitly or implicitly. Take explicit indication as an example, when it is pre-agreed that 0 represents two Rx, 1 represents four Rx, and 0 has been received by the UE, the current number of reception antennae may be set as two, i.e., the target number of reception antennae may be two.

According to the embodiments of the present disclosure, when the target transmission mode is transmitted by the network side device on its own initiative to the UE, the UE may set the target transmission mode as the current transmission mode. As a result, it is able to, on one hand, change the transmission mode of the UE accurately, reduce the unnecessary power consumption for the UE and achieve a power-saving effect, and on the other hand, ensure the data transmission performance of a system.

The target transmission mode may be determined by the network side device in accordance with transmission mode influencing factors. The transmission mode influencing factors may include at least one of a remaining battery of the UE, an overheating indication of the UE, an attribute of an uplink service, and an attribute of a downlink service. The remaining battery of the UE, the overheating indication of the UE and the attribute of the uplink service may be reported by the UE to the network side device. The network side device mainly determines the transmission mode of the UE, so the more the influencing factors for determining the target transmission mode, the more accurate the transmission mode of the UE. The way for determining the target transmission mode may refer to that mentioned hereinabove.

The target transmission mode may be transmitted through one of physical layer signaling, MAC signaling, RRC signaling and a WUS.

During the implementation, the UE may set the transmission mode in accordance with an indication from the network side device, and the network side device may indicate the target transmission mode explicitly. To be specific, the target transmission mode may be carried by the network side device in one of the physical layer signaling, the MAC signaling, the RRC signaling and the WUS. The UE may receive the signaling or signal explicitly indicating the target transmission mode from the network side device, and set the target transmission mode as the current transmission mode.

During the implementation, the UE may set the transmission mode in accordance with the indication from the network side device, and the network side device may indicate the target transmission mode implicitly. To be specific, S501 of receiving the target transmission mode from the network side device may include receiving indication signaling or an indication signal indicating the target transmission mode from the network side device. The indication signaling may include physical layer signaling, MAC signaling or RRC signaling, and the indication signal may include a WUS. The indication signaling or indication signal may carry one of the following parameters implicitly indicating the target transmission mode: BWP, MCS and the number of MIMO layers.

To be specific, S502 of setting the target transmission mode from the network side device as the current transmission mode may include: determining the target transmission mode from the network side device in accordance with the parameters carried in the indication signaling or indication signal and a predetermined correspondence, the predetermined correspondence including attribute value of the parameters and the transmission modes; and setting the target transmission mode from the network side device as the current transmission mode.

In the embodiments of the present disclosure, the network side device may configure the transmission mode of the UE implicitly. In this regard, when the network side device transmits the scheduling signaling carrying any one of the BWP, the MCS and the number of MIMO layers to the UE, it may implicitly notify the UE of the target transmission mode to be executed, so as to reduce the number of times for transmitting the scheduling signaling to the UE.

(1) When the target transmission mode is indicated implicitly through the BWP, a correspondence between serial numbers of BWPs and transmission modes may be pre-agreed. For example, when a serial number of a BWP is 1, it means that the number of reception antennae is two (i.e., two Rx), and when a serial number of a BWP is 2, it means that the number of reception antennae is four (four Rx).

Correspondingly, when the serial number of the received BWP is 1, the target transmission mode indicated by the network side device may include two reception antennae (two Rx), and at this time, the UE may set the current number of reception antennae as two.

Alternatively, a correspondence between widths of BWPs and transmission modes may be pre-agreed. For example, when a width of a BWP is smaller than or equal to 20 resource blocks (Resource Blocks, RBs), it means that the number of reception antennae is two (i.e., two Rx), and when a width of a BWP is greater than 20 RBs, it means that the number of reception antennae is four (four Rx).

Correspondingly, when the width of the received BWP is smaller than 20 RBs, the target transmission mode indicated by the network side device may include two reception antennae, and at this time, the UE may set the current number of reception antennae as two.

(2) When the target transmission mode is indicated implicitly through the MCS, a correspondence between modulation orders of the MCS and transmission modes may be pre-agreed. For example, when a modulation order of the MCS is smaller than or equal to 16-quadrature amplitude modulation (Quadrature Amplitude Modulation, QAM), it means that the number of reception antennae is two (i.e., two Rx), and when a modulation order of the MCS is greater than 16-QAM, it means that the number of reception antennae is four (four Rx).

Correspondingly, when the modulation order of the received MCS is smaller than 16-QAM, the target transmission mode indicated by the network side device may include two reception antennae (two Rx), and at this time, the UE may set the current number of reception antennae as two.

(3) When the target transmission mode is indicated implicitly through the number of MIMO layers, a correspondence between the numbers of MIMO layers and transmission modes may be pre-agreed. For example, when the number of MIMO layers is 1 or 2, it means that the number of reception antennae is two (i.e., two Rx), and when the number of MIMO layers is 3 or 4, it means that the number of reception antennae is four (four Rx).

Correspondingly, when the number of the received MIMO layers is 1, the target transmission mode indicated by the network side device may include two reception antennae (two Rx), and at this time, the UE may set the current number of reception antennae as two.

In addition, the target transmission mode may also be indicated implicitly using related parameters of the WUS. When the target transmission mode is transmitted through the WUS, S502 of setting the target transmission mode from the network side device as the current transmission mode may include: determining the target transmission mode in accordance with related information about the WUS and a predetermined correspondence, the predetermined correspondence including a correspondence between the related information about the WUS and the transmission modes; and setting the determined target transmission mode as the current transmission mode.

To be specific, the related information about the WUS may include at least one of an orthogonal cover code of a sequence of the WUS, a cyclic shift of the sequence of the WUS, a root sequence of the sequence of the WUS, and a scrambled sequence of the sequence of the WUS.

The WUS may be a sequence, and elements of the sequence may include the orthogonal cover code, the cyclic shift, the root sequence and the scrambled sequence. The WUSs, i.e., the sequences, including different elements may be different from each other. During the implementation, a correspondence between elements of sequences of WUSs and transmission modes may be pre-stored. Taking the orthogonal cover code of the sequence as an example, the orthogonal cover codes of two sequences may be used to indicate different transmission modes. For example, an orthogonal cover code 1 may indicate that the number of reception antennae is two (two Rx), and an orthogonal cover code 2 may indicate that the number of reception antennae is four (four Rx).

Correspondingly, when the orthogonal cover code of the sequence of the received WUS is an orthogonal cover code 1, the transmission mode indicated in the feedback information may include two reception antennae (two Rx), and at this time, the UE may set the current number of reception antennae as two.

Subsequent to setting the target transmission mode indicated by the network side device as the current transmission mode, the UE may perform data transmission in the target transmission mode and report channel-related parameters. To be specific, the UE may report the channel-related parameters to the network side device in accordance with the target transmission mode. The channel-related parameters may include at least one of CQI, RI, PMI and LI.

The current transmission mode of the UE may set in accordance with the target transmission mode from the network side device. When a transmission mode corresponding to the received scheduling signaling is different from the current transmission mode and the UE needs to execute the scheduling signaling in response to the scheduling from the network side device after the change of the transmission mode, there may exist a processing delay for the change of the transmission mode. Hence, the UE may select to be maintained in the current transmission mode, and ignore the scheduling from the network side device. To be specific, when the transmission mode corresponding to the scheduling signaling transmitted by the network side device is different from the target transmission mode, the UE may ignore the scheduling signaling from the network side device. The scheduling signaling may include signaling for scheduling downlink data or signaling for scheduling uplink data.

For example, the current transmission mode of the UE may include two reception antenna ports, and a downlink PMI indicated in the scheduling signaling from the network side device may be based on through four reception antenna ports, or a downlink RI indicated in the scheduling signaling may be greater than two or a downlink LI indicated in the scheduling signaling may be greater than two. At this time, it is impossible to execute the scheduling signaling from the network side device in the current transmission mode, so the UE may ignore, i.e., not execute, the scheduling signaling from the network side device. At this time, the UE may transmit an NACK to the network side device.

For another example, the current transmission mode of the UE may include one transmission antenna port, and an uplink PMI indicated in the scheduling signaling from the network side device may be based on through two reception antenna ports, or an uplink RI indicated in the scheduling signaling may be two or an uplink LI indicated in the scheduling signaling may be two. At this time, it is impossible to execute the scheduling signaling from the network side device in the current transmission mode, so the UE may ignore, i.e., not execute, the scheduling signaling from the network side device. At this time, the UE may not transmit the uplink data in accordance with an indication in the scheduling signaling.

According to the transmission mode determination method in the embodiments of the present disclosure, when the network side device transmits, on its own initiative, the target transmission mode to the UE, the UE may set the target transmission mode as the current transmission mode. As a result, it is able to, on one hand, change the transmission mode of the UE accurately, reduce the unnecessary power consumption for the UE and achieve a power-saving effect, and on the other hand, ensure the data transmission performance of a system.

The implementation of the transmission mode determination may refer to that mentioned herein, and thus will not be particularly repeated herein.

Correspondingly, the present disclosure further provides in some embodiments a transmission mode determination method for a network side device. Contents identical to those mentioned hereinabove will not be particularly repeated herein.

Figure 6:
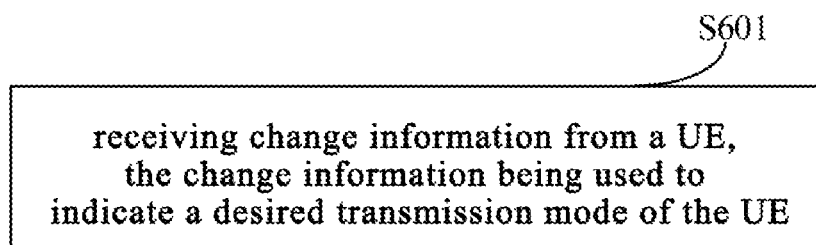
FIG. 6 is a flow chart of a transmission mode determination method for a network side device according to one embodiment of the present disclosure.

As shown in FIG. 6, the transmission mode determination method includes S601 of receiving change information from a UE. The change information is used to indicate a desired transmission mode of the UE, and the desired transmission mode includes at least one of the number of reception antennae, the number of transmission antennae, the number of reception antenna ports, the number of transmission antenna ports, the number of reception chains, the number of transmission chains, the maximum layers of downlink and the maximum layers of uplink, and values thereof.

After the UE determines that it is necessary to change a transmission mode, it may automatically transmit the change information for requesting the change of the transmission mode to the network side device. The change information may be information not carrying the desired transmission mode, or information for indicating the desired transmission mode, i.e., information carrying the desired transmission mode determined by the UE. During the implementation, in order to enable the network side device to rapidly determine the transmission mode to which the UE wants to be switched, in a possible embodiment of the present disclosure, the change information may be used to indicate the desired transmission mode of the UE.

According to the embodiments of the present disclosure, the network side device may receive the change information for requesting the change of the transmission mode from the UE, so that the network side device determines the transmission mode capable of being executed currently by the UE in accordance with the change information. As a result, it is able to, on one hand, change the transmission mode of the UE accurately, reduce the unnecessary power consumption for the UE and achieve a power-saving effect, and on the other hand, ensure the data transmission performance of a system.

During the implementation, upon the receipt of the change information from the UE, the network side device may transmit corresponding feedback information to the UE in accordance with the change information, so as to notify the UE of the transmission mode capable of being executed currently. At this time, upon the receipt of the feedback information, the UE may change the transmission mode in accordance with the feedback information. To be specific, subsequent to S601 of receiving the change information from the UE, the method may further include the following steps.

S602: determining the feedback information in accordance with the change information. To be specific, upon the receipt of the change information from the UE, the network side device may determine the transmission mode capable of being executed currently by the UE in accordance with the change information, and generate the corresponding feedback information in accordance with a determination result.

S603: transmitting the feedback information to the UE, so that the UE sets the transmission mode indicated in the feedback information as the current transmission mode. The feedback information may be used to indicate whether the desired transmission mode is allowed, or indicate a target transmission mode. To be specific, the target transmission mode may be determined by the network side device in accordance with transmission mode influencing factors. The target transmission mode may be the same as, or different from, the desired transmission mode.

To be specific, in order to configure the transmission mode of the UE in a more accurate manner, the network side device may determine the feedback information with reference to the transmission mode influencing parameters. Hence, the determining the feedback information in accordance with the change information may include determining the feedback information in accordance with the change information and the transmission mode influencing factors. The network side device may determine the transmission mode capable of being executed currently by the UE in accordance with a plurality of transmission mode influencing factors, and when the determined transmission mode is the same as the current transmission mode of the UE, the network side device may transmit the feedback information indicating that the desired transmission mode is not allowed to the UE. Upon the receipt of the feedback information, the UE may be continuously maintained in the current transmission mode.

For example, when the number of reception antennae for the UE is four (i.e., four Rx), the UE may determine that the desired number of reception antennae is two (i.e., two Rx) in accordance with its own attributes (e.g., a heating state), but the network side device may determine that the number of reception antennae to be used by the UE is four in accordance with attributes of downlink services. At this time, the feedback information transmitted by the network side device may indicate that the desired transmission mode is not allowed.

The transmission mode influencing factors for determining, by the network side device, the feedback information may include at least one of a remaining battery of the UE, an overheating indication of the UE, an attribute of an uplink service, and an attribute of a downlink service. The determination of the feedback information may refer to that mentioned hereinabove, and thus will not be particularly repeated herein.

The transmission mode may be associated with a serving cell, or with a target BWP of the serving cell. To be specific, the change information may be used to request the change of a transmission mode with respect to the serving cell or a transmission mode with respect to one or more target BWPs. The transmission modes for different BWPs may be different from each other.

Further, the network side device may receive at least one of the remaining battery of the UE, the overheating indication of the UE, the attribute of the uplink service and the attribute of the downlink service from the UE as the transmission mode influencing factors for determining the feedback information.

To be specific, the feedback information may be transmitted by the network side device to the UE through one of physical layer signaling, MAC signaling, RRC signaling and a WUS.

When the feedback information is transmitted through the WUS, there may exist a predetermined correspondence between related information about the WUS and the transmission modes, so that the UE determines the transmission mode indicated in the feedback information in accordance with the related information about the WUS and the predetermined correspondence.

To be specific, upon the receipt of the feedback information, the determining, by the UE, the transmission mode indicated in the feedback information as the current transmission mode may include: determining the transmission mode indicated in the feedback information in accordance with the related information about the WUS and the predetermined correspondence, the predetermined correspondence including a correspondence between the related information about the WUS and the transmission modes; and setting the transmission mode indicated in the feedback information as the current transmission mode. The transmission mode indicated in the feedback information may be the same as, or different from, the desired transmission mode.

To be specific, the related information about the WUS may include at least one of an orthogonal cover code of a sequence of the WUS, a cyclic shift of the sequence of the WUS, a root sequence of the sequence of the WUS, and a scrambled sequence of the sequence of the WUS.

The WUS may be a sequence, and elements of the sequence may include the orthogonal cover code, the cyclic shift, the root sequence and the scrambled sequence. The WUSs, i.e., the sequences, including different elements may be different from each other. During the implementation, a correspondence between elements of sequences of WUSs and transmission modes may be pre-stored. Taking the orthogonal cover code of the sequence as an example, the orthogonal cover codes of two sequences may be used to indicate different transmission modes. For example, an orthogonal cover code 1 may indicate that the number of reception antennae is two (two Rx), and an orthogonal cover code 2 may indicate that the number of reception antennae is four (four Rx).

Correspondingly, when the orthogonal cover code of the sequence of the received WUS is an orthogonal cover code 1, the transmission mode indicated in the feedback information may include two reception antennae (two Rx), and at this time, the UE may set the current number of reception antennae as two.

According to the transmission mode determination mode in the embodiments of the present disclosure, the network side device may receive the change information for requesting the change of the transmission mode from the UE, so that the network side device determines the transmission mode capable of being executed currently by the UE in accordance with the change information. As a result, it is able to, on one hand, change the transmission mode of the UE accurately, reduce the unnecessary power consumption for the UE and achieve a power-saving effect, and on the other hand, ensure the data transmission performance of a system.

The implementation of the transmission mode determination method may refer to that mentioned hereinabove, and thus will not be particularly repeated herein.

Correspondingly, the present disclosure further provides in some embodiments a transmission mode determination method for a network side device. Contents identical to those mentioned hereinabove will not be particularly repeated herein.

Figure 7:
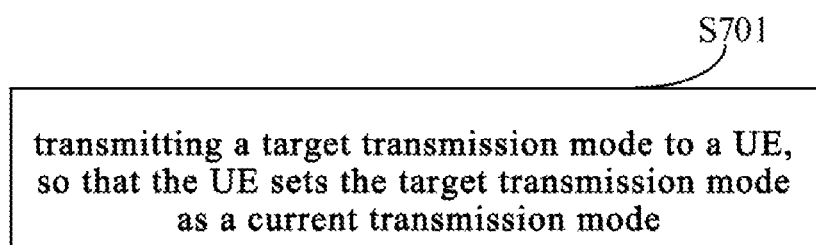
FIG. 7 is a flow chart of a transmission mode determination method for the network side device according to one embodiment of the present disclosure.

As shown in FIG. 7, the transmission mode determination method includes S701 of transmitting a target transmission mode to a UE, so that the UE sets the target transmission mode as a current transmission mode. In the case that no change request is transmitted by the UE, the network side device may transmit, on its own initiative, the target transmission mode to the UE when the UE needs to change a transmission mode.

To be specific, the network side device may indicate the target transmission mode explicitly or implicitly. Take explicit indication as an example, when it is pre-agreed that 0 represents two Rx, 1 represents four Rx, and 0 has been received by the UE, the current number of reception antennae may be set as two, i.e., the target number of reception antennae may be two.

According to the embodiments of the present disclosure, when the UE needs to change the transmission mode, the network side device may transmit, on its own initiative, the target transmission mode to the UE, so that the UE sets the target transmission mode as the current transmission mode. As a result, it is able to, on one hand, change the transmission mode of the UE accurately, reduce the unnecessary power consumption for the UE and achieve a power-saving effect, and on the other hand, ensure the data transmission performance of a system.

Prior to S701 of transmitting the target transmission mode to the UE, the method may further include determining the target transmission mode in accordance with transmission mode influencing factors.

The target transmission mode may be determined by the network side device in accordance with the transmission mode influencing factors. The transmission mode influencing factors may include at least one of a remaining battery of the UE, an overheating indication of the UE, an attribute of an uplink service, and an attribute of a downlink service. The remaining battery of the UE, the overheating indication of the UE and the attribute of the uplink service may be reported by the UE to the network side device. The network side device mainly determines the transmission mode of the UE, so the more the influencing factors for determining the target transmission mode, the more accurate the transmission mode of the UE. The way for determining the target transmission mode may refer to that mentioned hereinabove.

The target transmission mode may be transmitted through one of physical layer signaling, MAC signaling, RRC signaling and a WUS.

During the implementation, the UE may set the transmission mode in accordance with an indication from the network side device, and the network side device may indicate the target transmission mode explicitly. To be specific, the target transmission mode may be carried by the network side device in one of the physical layer signaling, the MAC signaling, the RRC signaling and the WUS. The UE may receive the signaling or signal explicitly indicating the target transmission mode from the network side device, and set the target transmission mode as the current transmission mode.

During the implementation, the UE may set the transmission mode in accordance with the indication from the network side device, and the network side device may indicate the target transmission mode implicitly.

To be specific, S701 of transmitting the target transmission mode to the UE may include transmitting indication signaling or an indication signal indicating the target transmission mode to the UE. The indication signaling may include physical layer signaling, MAC signaling or RRC signaling, and the indication signal may include a WUS. The indication signaling or indication signal may carry one of the following parameters implicitly indicating the target transmission mode: BWP, MCS and the number of MIMO layers.

Upon the receipt of the indication signaling or indication signal from the network side device, the setting, by the UE, the target transmission mode from the network side device as the current transmission mode may include: determining the target transmission mode indicated by the network side device in accordance with the parameters carried in the indication signaling or indication signal and a predetermined correspondence, the predetermined correspondence including a correspondence between different attribute values of the parameters and the transmission modes; and setting the target transmission mode indicated by the network side device as the current transmission mode.

In the embodiments of the present disclosure, the network side device may configure the transmission mode of the UE implicitly. In this regard, when the network side device transmits the scheduling signaling carrying any one of the BWP, the MCS and the number of MIMO layers to the UE, it may implicitly notify the UE of the target transmission mode to be executed, so as to reduce the number of times for transmitting the scheduling signaling to the UE.

(1) When the target transmission mode is indicated implicitly through the BWP, a correspondence between serial numbers of BWPs and transmission modes may be pre-agreed. For example, when a serial number of a BWP is 1, it means that the number of reception antennae is two (i.e., two Rx), and when a serial number of a BWP is 2, it means that the number of reception antennae is four (four Rx).

Correspondingly, when the serial number of the received BWP is 1, the target transmission mode indicated by the network side device may include two reception antennae (two Rx), and at this time, the UE may set the current number of reception antennae as two.

Alternatively, a correspondence between widths of BWPs and transmission modes may be pre-agreed. For example, when a width of a BWP is smaller than or equal to 20 RBs, it means that the number of reception antennae is two (i.e., two Rx), and when a width of a BWP is greater than 20 RBs, it means that the number of reception antennae is four (four Rx).

Correspondingly, when the width of the received BWP is smaller than 20 RBs, the target transmission mode indicated by the network side device may include two reception antennae (two Rx), and at this time, the UE may set the current number of reception antennae as two.

(2) When the target transmission mode is indicated implicitly through the MCS, a correspondence between modulation orders of the MCS and transmission modes may be pre-agreed. For example, when a modulation order of the MCS is smaller than or equal to 16-QAM, it means that the number of reception antennae is two (i.e., two Rx), and when a modulation order of the MCS is greater than 16-QAM, it means that the number of reception antennae is four (four Rx).

Correspondingly, when the modulation order of the received MCS is smaller than 16-QAM, the target transmission mode indicated by the network side device may include two reception antennae (two Rx), and at this time, the UE may set the current number of reception antennae as two.

(3) When the target transmission mode is indicated implicitly through the number of MIMO layers, a correspondence between the numbers of MIMO layers and transmission modes may be pre-agreed. For example, when the number of MIMO layers is 1 or 2, it means that the number of reception antennae is two (i.e., two Rx), and when the number of MIMO layers is 3 or 4, it means that the number of reception antennae is four (four Rx).

Correspondingly, when the number of the received MIMO layers is 1, the target transmission mode indicated by the network side device may include two reception antennae (two Rx), and at this time, the UE may set the current number of reception antennae as two.

In addition, the target transmission mode may also be indicated implicitly using related parameters of the WUS. When the target transmission mode is transmitted through the WUS, upon the receipt of the indication signaling or indication signal from the network side device, the setting, by the UE, the target transmission mode from the network side device as the current transmission mode may include: determining the target transmission mode in accordance with related information about the WUS and a predetermined correspondence, the predetermined correspondence including a correspondence between the related information about the WUS and the transmission modes; and setting the determined target transmission mode as the current transmission mode.

To be specific, the related information about the WUS may include at least one of an orthogonal cover code of a sequence of the WUS, a cyclic shift of the sequence of the WUS, a root sequence of the sequence of the WUS, and a scrambled sequence of the sequence of the WUS.

The WUS may be a sequence, and elements of the sequence may include the orthogonal cover code, the cyclic shift, the root sequence and the scrambled sequence. The WUSs, i.e., the sequences, including different elements may be different from each other. During the implementation, a correspondence between elements of sequences of WUSs and transmission modes may be pre-stored. Taking the orthogonal cover code of the sequence as an example, the orthogonal cover codes of two sequences may be used to indicate different transmission modes. For example, an orthogonal cover code 1 may indicate that the number of reception antennae is two (two Rx), and an orthogonal cover code 2 may indicate that the number of reception antennae is four (four Rx).

Correspondingly, when the orthogonal cover code of the sequence of the received WUS is an orthogonal cover code 1, the transmission mode indicated in the feedback information may include two reception antennae (two Rx), and at this time, the UE may set the current number of reception antennae as two.

According to the transmission mode determination method in the embodiments of the present disclosure, the network side device may transmit, on its own initiative, the target transmission mode to the UE when the UE needs to change the transmission mode, so that the UE sets the target transmission mode as the current transmission mode. As a result, it is able to, on one hand, change the transmission mode of the UE accurately, reduce the unnecessary power consumption for the UE and achieve a power-saving effect, and on the other hand, ensure the data transmission performance of a system.

The implementation of the transmission mode determination method may refer to that mentioned hereinabove, and thus will not be particularly repeated herein.

Corresponding to the above-mentioned transmission mode determination method, the present disclosure further provides in some embodiments a UE capable of implementing the above-mentioned transmission mode determination method.

Figure 8:
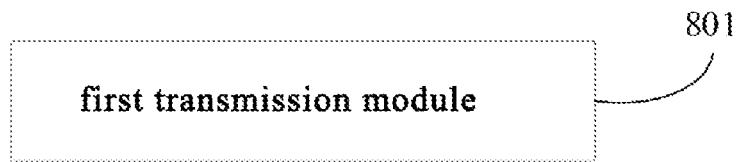
FIG. 8 is a schematic view showing a first kind of modules arrangement of the UE according to one embodiment of the present disclosure.

As shown in FIG. 8, the UE includes a first transmission module 801 configured to transmit change information to a network side device. The change information is used to indicate a desired transmission mode of the UE, and the desired transmission mode includes at least one of the number of reception antennae, the number of transmission antennae, the number of reception antenna ports, the number of transmission antenna ports, the number of reception chains, the number of transmission chains, the maximum layers of downlink and the maximum layers of uplink, and values thereof.

In a possible embodiment of the present disclosure, the UE may further include: a feedback information reception module configured to, after the change information has been transmitted to the network side device, receive feedback information from the network side device; and a transmission mode setting module configured to set a transmission mode indicated in the feedback information as a current transmission mode.

In a possible embodiment of the present disclosure, the feedback information may be used to indicate whether the desired transmission mode is allowed, or indicate a target transmission mode.

In a possible embodiment of the present disclosure, the transmission mode setting module is further configured to: when the feedback information indicates that the desired transmission mode is allowed, set the desired transmission mode as the current transmission mode; when the feedback information indicates that the desired transmission mode is not allowed, maintain the current transmission mode; and when the feedback information indicates the target transmission mode, set the target transmission mode as the current transmission mode.

In a possible embodiment of the present disclosure, the UE may further include a desired transmission mode determination module configured to, prior to transmitting the change information to the network side device, determine the desired transmission mode in accordance with transmission mode influencing factors.

In a possible embodiment of the present disclosure, the UE may further include a channel parameter transmission module configured to, upon the receipt of the feedback information, report channel-related parameters to the network side device in accordance with the transmission mode indicated in the feedback information. The channel-related parameters may include at least one of a CQI, an RI, a PMI, and an LI.

In a possible embodiment of the present disclosure, the UE may further include a first determination module configured to, after the transmission mode indicate din the feedback information has been set as the current transmission mode, when the transmission mode corresponding to scheduling signaling from the network side device is different from the transmission mode indicated in the feedback information, ignore the scheduling signaling from the network side. The scheduling signaling may include signaling for scheduling downlink data or signaling for scheduling uplink data.

In a possible embodiment of the present disclosure, the transmission mode influencing factors may include at least one of a remaining battery of the UE, an overheating indication of the UE, an attribute of an uplink service, and an attribute of a downlink service.

In a possible embodiment of the present disclosure, the desired transmission mode may be associated with a serving cell, or a target BWP of the serving cell.

In a possible embodiment of the present disclosure, the UE may further include an information transmission configured to transmit at least one of the remaining battery of the UE, the overheating indication of the UE, the attribute of the uplink service and the attribute of the downlink service to the network side device.

In a possible embodiment of the present disclosure, the feedback information may be transmitted through one of physical layer signaling, MAC signaling, RRC signaling and a WUS.

In a possible embodiment of the present disclosure, the transmission mode setting module is further configured to: when the feedback information is transmitted through the WUS, determine the transmission mode indicated in the feedback information in accordance with related information about the WUS and a predetermined correspondence, the predetermined correspondence including a correspondence between the related information about the WUS and transmission modes; and set the transmission mode indicated in the feedback information as the current transmission mode.

In a possible embodiment of the present disclosure, the related information about the WUS may include at least one of an orthogonal cover code of a sequence of the WUS, a cyclic shift of the sequence of the WUS, a root sequence of the sequence of the WUS, and a scrambled sequence of the sequence of the WUS.

According to the UE in the embodiments of the present disclosure, the change information indicating the desired transmission mode of the UE may be transmitted to the network side device. In the embodiments of the present disclosure, the UE may transmit the change information for requesting the change of the transmission mode to the network side device, so that the network side device determines the transmission mode capable of being executed currently by the UE in accordance with the change information. As a result, it is able to, on one hand, change the transmission mode of the UE accurately, reduce the unnecessary power consumption for the UE and achieve a power-saving effect, and on the other hand, ensure the data transmission performance of a system.

The UE in the embodiments of the present disclosure is capable of implementing the above-mentioned transmission mode determination method, which will thus not be particularly repeated herein.

Corresponding to the other transmission mode determination method mentioned hereinabove, the present disclosure provides in some embodiments a UE capable of implementing the above-mentioned transmission mode determination method.

Figure 9:
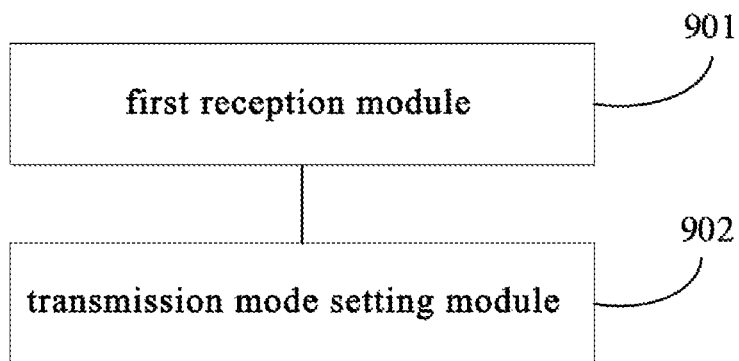
FIG. 9 is a schematic view showing a second kind of modules arrangement of the UE according to one embodiment of the present disclosure.

As shown in FIG. 9, the UE includes: a first reception module 901 configured to receive a target transmission mode from a network side device; and a transmission mode setting module 902 configured to set the target transmission mode as a current transmission mode.

In a possible embodiment of the present disclosure, the UE may further include a channel parameter transmission module configured to report channel-related parameters to the network side device in accordance with the target transmission mode. The channel-related parameters may include at least one of a CQI, an RI, a PMI, and an LI.

In a possible embodiment of the present disclosure, the UE may further include a second determination module configured to, when a transmission mode corresponding to scheduling signaling from the network side device is different from the target transmission mode, ignore the scheduling signaling from the network side device. The scheduling signaling may include signaling for scheduling downlink data or signaling for scheduling uplink data.

In a possible embodiment of the present disclosure, the target transmission mode may be transmitted through one of physical layer signaling, MAC signaling, RRC signaling and a WUS.

According to the UE in the embodiments of the present disclosure, when the target transmission mode is transmitted by the network side device on its own initiative to the UE, the UE may set the target transmission mode as the current transmission mode. As a result, it is able to, on one hand, change the transmission mode of the UE accurately, reduce the unnecessary power consumption for the UE and achieve a power-saving effect, and on the other hand, ensure the data transmission performance of a system.

The UE in the embodiments of the present disclosure is capable of implementing the above-mentioned transmission mode determination mode, which will not be particularly repeated herein.

Corresponding to the above-mentioned transmission mode determination method, the present disclosure further provides in some embodiments a network side device capable of implementing the above-mentioned transmission mode determination method.

Figure 10:
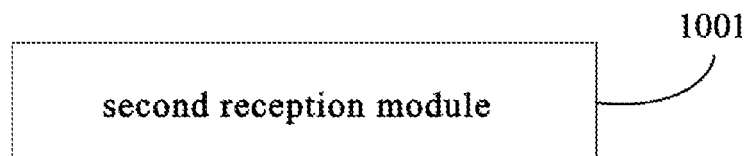
FIG. 10 is a schematic view showing a first kind of modules arrangement of the network side device according to one embodiment of the present disclosure.

As shown in FIG. 10, the network side device includes a second reception module 1001 configured to receive change information from a UE. The change information is used to indicate a desired transmission mode of the UE, and the desired transmission mode includes at least one of the number of reception antennae, the number of transmission antennae, the number of reception antenna ports, the number of transmission antenna ports, the number of reception chains, the number of transmission chains, the maximum layers of downlink and the maximum layers of uplink, and values thereof.

In a possible embodiment of the present disclosure, the network side device may further include: a feedback information determination module configured to, upon the receipt of the change information from the UE, determine feedback information in accordance with the change information; and a feedback information transmission module configured to transmit the feedback information to the UE, so that the UE sets a transmission mode indicated in the feedback information as a current transmission mode.

In a possible embodiment of the present disclosure, the feedback information may be used to indicate whether the desired transmission mode is allowed, or indicate a target transmission mode.

In a possible embodiment of the present disclosure, the feedback information determination module is further configured to determine the feedback information in accordance with the change information and transmission mode influencing factors.

In a possible embodiment of the present disclosure, the transmission mode influencing factors may include at least one of a remaining battery of the UE, an overheating indication of the UE, an attribute of an uplink service, and an attribute of a downlink service.

In a possible embodiment of the present disclosure, the desired transmission mode may be associated with a serving cell, or a target BWP of the serving cell.

In a possible embodiment of the present disclosure, the network side device may further include an information reception module configured to receive at least one of the remaining battery of the UE, the overheating indication of the UE, the attribute of the uplink service and the attribute of the downlink service from the UE.

In a possible embodiment of the present disclosure, the feedback information may be transmitted through one of physical layer signaling, MAC signaling, RRC signaling and a WUS.

In a possible embodiment of the present disclosure, when the WUS is transmitted through the feedback information, a predetermined correspondence may be provided between related information about the WUS and transmission modes, so that the UE determines the transmission mode indicated in the feedback information in accordance with the related information about the WUS and the predetermined correspondence.

In a possible embodiment of the present disclosure, the related information about the WUS may include at least one of an orthogonal cover code of a sequence of the WUS, a cyclic shift of the sequence of the WUS, a root sequence of the sequence of the WUS, and a scrambled sequence of the sequence of the WUS.

According to the network side device in the embodiments of the present disclosure, the network side device may receive the change information for requesting the change of the transmission mode from the UE, so that the network side device determines the transmission mode capable of being executed currently by the UE in accordance with the change information. As a result, it is able to, on one hand, change the transmission mode of the UE accurately, reduce the unnecessary power consumption for the UE and achieve a power-saving effect, and on the other hand, ensure the data transmission performance of a system.

The network side device in the embodiments of the present disclosure is capable of implementing the above-mentioned transmission mode determination method, which will not be particularly repeated herein.

Corresponding to the above-mentioned transmission mode determination method, the present disclosure further provides in some embodiments a network side device capable of implementing the above-mentioned transmission mode determination method.

Figure 11:
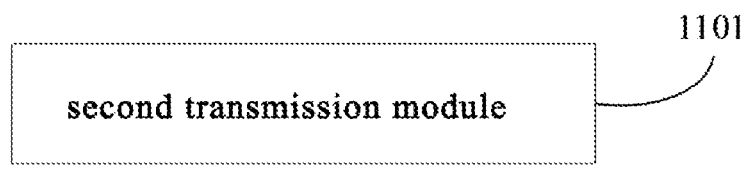
FIG. 11 is a schematic view showing a second kind of modules arrangement of the network side device according to one embodiment of the present disclosure.

As shown in FIG. 11, the network side device includes a second transmission module 1101 configured to transmit a target transmission mode to a UE, so that the UE sets the target transmission mode as a current transmission mode.

In a possible embodiment of the present disclosure, the network side device may further include a target transmission mode determination module configured to, prior to transmitting the target transmission mode to the UE, determine the target transmission mode in accordance with transmission mode influencing factors.

In a possible embodiment of the present disclosure, the target transmission mode may be transmitted through one of physical layer signaling, MAC signaling, RRC signaling, and a WUS.

According to the network side device in the embodiments of the present disclosure, when the UE needs to change the transmission mode, the network side device may transmit, on its own initiative, the target transmission mode to the UE, so that the UE sets the target transmission mode as the current transmission mode. As a result, it is able to, on one hand, change the transmission mode of the UE accurately, reduce the unnecessary power consumption for the UE and achieve a power-saving effect, and on the other hand, ensure the data transmission performance of a system.

The network side device in the embodiments of the present disclosure is capable of implementing the above-mentioned transmission mode determination method, which will not be particularly repeated herein.

Corresponding to the above-mentioned transmission mode determination method, based on a same technical concept, the present disclosure further provides in some embodiments a UE capable of implementing the above-mentioned transmission mode determination method.

Figure 12:
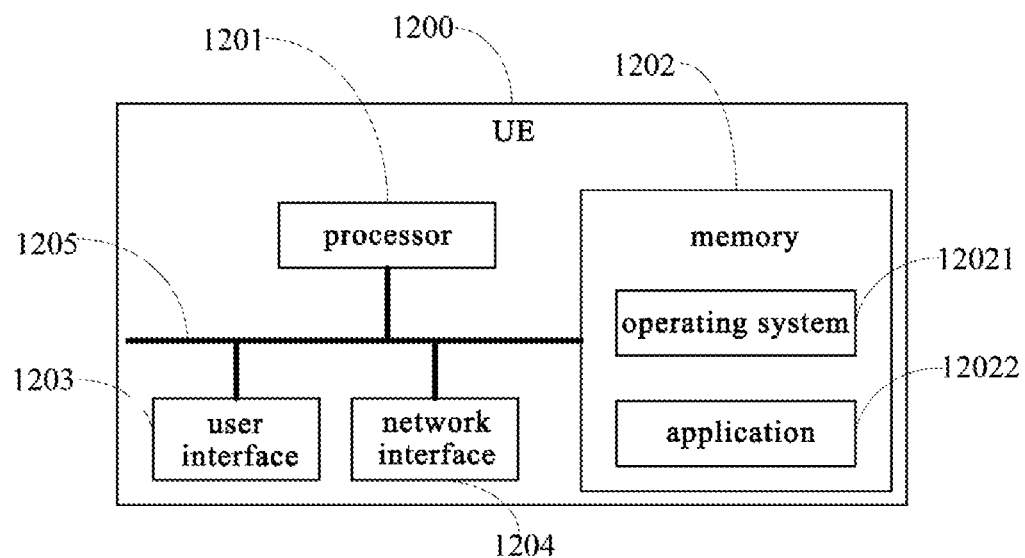
FIG. 12 is a schematic view showing the network side device according to one embodiment of the present disclosure.

As shown in FIG. 12, the UE 1200 includes at least one processor 1201, a memory 1202, at least one network interface 1204 and a user interface 1203. The components of the UE 1200 may be coupled together through a bus system 1205. It should be appreciated that, the bus system 1205 is configured to achieve connection and communication among the components. Apart from a data bus, the bus system 1205 may further include a power source bus, a control bus and a state signal bus. For clarification, all these buses in FIG. 12 may be collectively called as bus system 1205.

The user interface 1203 may include a display, a keyboard or a pointing device (e.g., mouse, track ball, touch plate or touch panel).

It should be appreciated that, the memory 1202 may include a volatile memory, a nonvolatile memory or both. The nonvolatile memory may be a read-only memory (Read-Only Memory, ROM), a programmable ROM (Programmable ROM, PROM), an erasable PROM (Erasable PROM, EPROM), an electrically EPROM (Electrically EPROM, EEPROM) or a flash memory. The volatile memory may be a random access memory (Random Access Memory, RAM) which serves as an external high-speed cache. Illustratively but not restrictively, the RAM may include static RAM (Static RAM, SRAM), dynamic RAM (Dynamic RAM, DRAM), synchronous DRAM (Synchronous DRAM, SDRAM), double data rate SDRAM (Double Data Rate SDRAM, DDRSDRAM), enhanced SDRAM (Enhanced SDRAM, ESDRAM), synchronous link DRAM (Synchronous Link DRAM, SLDRAM) or direct Rambus RAM (Direct Rambus RAM, DRRAM). The memory 1202 intends to include, but not limited to, the above-mentioned and any other appropriate memories.

In a possible embodiment of the present disclosure, the following elements may be stored in the memory 1202: an executable module or data structure, a subset or an extended set thereof, an operating system 12021 and an application 12022.

The operating system 12021 may include various system programs, e.g., a framework layer, a core layer and a driving layer, so as to implement various basic services and process hardware-based tasks. The application 12022 may include various applications, e.g., Media Player and Browser, so as to implement various application services. The programs for implementing the above-mentioned method may be included in the application 12022.

In a possible embodiment of the present disclosure, the UE 1200 may further include a computer program stored in the memory 1202 and executed by the processor 1201. The processor 1201 is configured to execute the computer program so as to transmit change information to a network side device. The change information may be used to indicate a desired transmission mode of the UE, and the desired transmission mode may include at least one of the number of reception antennae, the number of transmission antennae, the number of reception antenna ports, the number of transmission antenna ports, the number of reception chains, the number of transmission chains, the maximum layers of downlink and the maximum layers of uplink, and values thereof.

In a possible embodiment of the present disclosure, the processor 1201 is further configured to execute the computer program, so as to: after the change information has been transmitted to the network side device, receive feedback information from the network side device; and set a transmission mode indicated in the feedback information as a current transmission mode.

In a possible embodiment of the present disclosure, the feedback information may be used to indicate whether the desired transmission mode is allowed, or indicate a target transmission mode.

In a possible embodiment of the present disclosure, when setting the transmission mode indicated in the feedback information as the current transmission mode, the processor 1201 is further configured to execute the computer program, so as to: when the feedback information indicates that the desired transmission mode is allowed, set the desired transmission mode as the current transmission mode; when the feedback information indicates that the desired transmission mode is not allowed, maintain the current transmission mode; and when the feedback information indicates the target transmission mode, set the target transmission mode as the current transmission mode.

In a possible embodiment of the present disclosure, the processor 1201 is further configured to execute the computer program, so as to, prior to transmitting the change information to the network side device, determine the desired transmission mode in accordance with transmission mode influencing factors.

In a possible embodiment of the present disclosure, the processor 1201 is further configured to execute the computer program, so as to, upon the receipt of the feedback information, report channel-related parameters to the network side device in accordance with the transmission mode indicated in the feedback information. The channel-related parameters may include at least one of a CQI, an RI, a PMI, and an LI.

In a possible embodiment of the present disclosure, the processor 1201 is further configured to execute the computer program, so as to, after the transmission mode indicate din the feedback information has been set as the current transmission mode, when the transmission mode corresponding to scheduling signaling from the network side device is different from the transmission mode indicated in the feedback information, ignore the scheduling signaling from the network side. The scheduling signaling may include signaling for scheduling downlink data or signaling for scheduling uplink data.

In a possible embodiment of the present disclosure, the transmission mode influencing factors may include at least one of a remaining battery of the UE, an overheating indication of the UE, an attribute of an uplink service, and an attribute of a downlink service.

In a possible embodiment of the present disclosure, the desired transmission mode may be associated with a serving cell, or a target BWP of the serving cell.

In a possible embodiment of the present disclosure, the processor 1201 is further configured to execute the computer program, so as to transmit at least one of the remaining battery of the UE, the overheating indication of the UE, the attribute of the uplink service and the attribute of the downlink service to the network side device.

In a possible embodiment of the present disclosure, the feedback information may be transmitted through one of physical layer signaling, MAC signaling, RRC signaling and a WUS.

In a possible embodiment of the present disclosure, when setting the transmission mode indicated in the feedback information as the current transmission mode, the processor 1201 is further configured to execute the computer program, so as to: when the feedback information is transmitted through the WUS, determine the transmission mode indicated in the feedback information in accordance with related information about the WUS and a predetermined correspondence, the predetermined correspondence including a correspondence between the related information about the WUS and transmission modes; and set the transmission mode indicated in the feedback information as the current transmission mode.

In a possible embodiment of the present disclosure, the related information about the WUS may include at least one of an orthogonal cover code of a sequence of the WUS, a cyclic shift of the sequence of the WUS, a root sequence of the sequence of the WUS, and a scrambled sequence of the sequence of the WUS.

According to the UE 1200 in the embodiments of the present disclosure, the change information indicating the desired transmission mode of the UE may be transmitted to the network side device. In the embodiments of the present disclosure, the UE may transmit the change information for requesting the change of the transmission mode to the network side device, so that the network side device determines the transmission mode capable of being executed currently by the UE in accordance with the change information. As a result, it is able to, on one hand, change the transmission mode of the UE accurately, reduce the unnecessary power consumption for the UE and achieve a power-saving effect, and on the other hand, ensure the data transmission performance of a system.

In another possible embodiment of the present disclosure, the UE 1200 may further include a computer program stored in the memory 1202 and executed by the processor 1201. The processor 1201 is configured to execute the computer program so as to: receive a target transmission mode from a network side device; and set the target transmission mode as a current transmission mode.

In a possible embodiment of the present disclosure, the processor 1201 is further configured to execute the computer program, so as to report channel-related parameters to the network side device in accordance with the target transmission mode. The channel-related parameters may include at least one of a CQI, an RI, a PMI, and an LI.

In a possible embodiment of the present disclosure, the processor 1201 is further configured to execute the computer program, so as to, when a transmission mode corresponding to scheduling signaling from the network side device is different from the target transmission mode, ignore the scheduling signaling from the network side device. The scheduling signaling may include signaling for scheduling downlink data or signaling for scheduling uplink data.

In a possible embodiment of the present disclosure, the target transmission mode may be transmitted through one of physical layer signaling, MAC signaling, RRC signaling and a WUS.

According to the UE 1200 in the embodiments of the present disclosure, when the target transmission mode is transmitted by the network side device on its own initiative to the UE, the UE may set the target transmission mode as the current transmission mode. As a result, it is able to, on one hand, change the transmission mode of the UE accurately, reduce the unnecessary power consumption for the UE and achieve a power-saving effect, and on the other hand, ensure the data transmission performance of a system.

The above-mentioned method may be applied to, or implemented by, the processor 1201. The processor 1201 may be an integrated circuit (Integrated Circuit, IC) having a signal processing capability. During the implementation, the steps of the above-mentioned method may be completed through an integrated logic circuit of hardware in the processor 1201 or instructions in the form of software. The processor 1201 may be a general-purpose processor, a digital signal processor, an application-specific integrated circuit (Application-Specific Integrated Circuit, ASIC), a field programmable gate array (Field Programmable Gate Array, FPGA) or any other programmable logic element, a discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules in the processor. The software module may be located in a known storage medium such as an RAM, a flash memory, an ROM, a PROM, an EEPROM, or a register. The storage medium may be located in the memory 1202, and the processor 1201 may read information stored in the memory 1202 so as to implement the steps of the method in conjunction with the hardware. To be specific, a computer program may be stored in the computer-readable storage medium, and it may be executed by the processor 1201 so as to implement the steps mentioned hereinabove.

It should be appreciated that, the UE 1200 in the embodiments of the present disclosure is capable of implementing the procedures for the UE mentioned hereinabove, which will not be particularly repeated herein.

Corresponding to the above-mentioned transmission mode determination method, the present disclosure further provides in some embodiments a network side device capable of implementing the above-mentioned transmission mode determination method.

Figure 13:
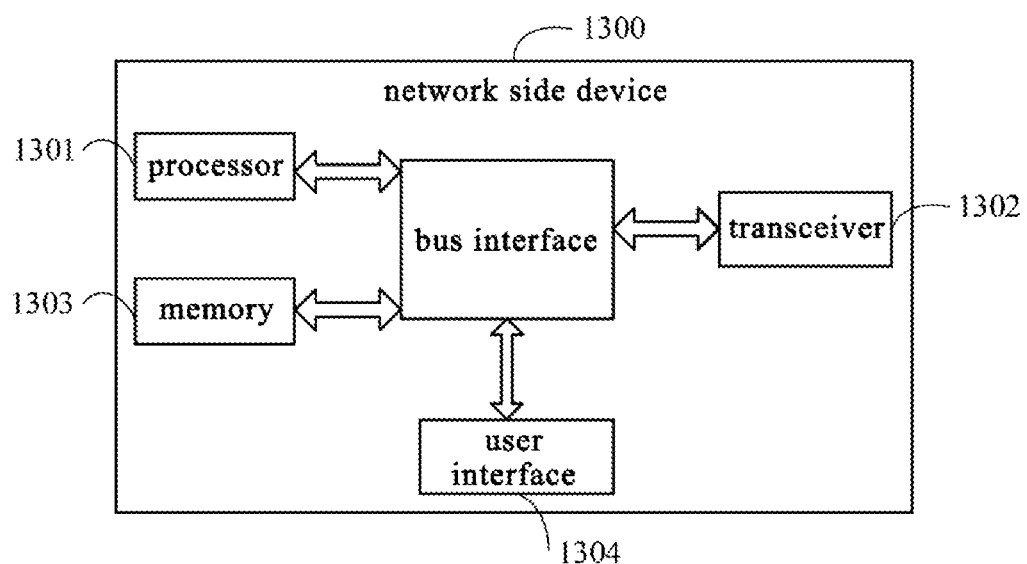
FIG. 13 is a schematic view showing the UE according to one embodiment of the present disclosure.

FIG. 13 shows the network side device capable of implementing the above-mentioned transmission mode determination method for the network side device, with a same technical effect. As shown in FIG. 13, the network side device 1300 includes a processor 1301, a transceiver 1302, a memory 1303, a user interface and a bus interface.

In a possible embodiment of the present disclosure, the network side device 1300 may further include computer program stored in the memory 1303 and executed by the processor 1301. The processor 1301 is configured to execute the computer program so as to receive change information from a UE. The change information may be used to indicate a desired transmission mode of the UE, and the desired transmission mode may include at least one of the number of reception antennae, the number of transmission antennae, the number of reception antenna ports, the number of transmission antenna ports, the number of reception chains, the number of transmission chains, the maximum layers of downlink and the maximum layers of uplink, and values thereof.

In a possible embodiment of the present disclosure, the processor 1301 is further configured to execute the computer program stored in the memory 1303, so as to: upon the receipt of the change information from the UE, determine feedback information in accordance with the change information; and transmit the feedback information to the UE, so that the UE sets a transmission mode indicated in the feedback information as a current transmission mode.

In a possible embodiment of the present disclosure, the feedback information may be used to indicate whether the desired transmission mode is allowed, or indicate a target transmission mode.

In a possible embodiment of the present disclosure, when determining the feedback information in accordance with the change information, the processor 1301 is further configured to execute the computer program stored in the memory 1303, so as to determine the feedback information in accordance with the change information and transmission mode influencing factors.

In a possible embodiment of the present disclosure, the transmission mode influencing factors may include at least one of a remaining battery of the UE, an overheating indication of the UE, an attribute of an uplink service, and an attribute of a downlink service.

In a possible embodiment of the present disclosure, the desired transmission mode may be associated with a serving cell, or a target BWP of the serving cell.

In a possible embodiment of the present disclosure, the processor 1301 is further configured to execute the computer program stored in the memory 1303, so as to receive at least one of the remaining battery of the UE, the overheating indication of the UE, the attribute of the uplink service and the attribute of the downlink service from the UE.

In a possible embodiment of the present disclosure, the feedback information may be transmitted through one of physical layer signaling, MAC signaling, RRC signaling and a WUS.

In a possible embodiment of the present disclosure, when the WUS is transmitted through the feedback information, a predetermined correspondence may be provided between related information about the WUS and transmission modes, so that the UE determines the transmission mode indicated in the feedback information in accordance with the related information about the WUS and the predetermined correspondence.

In a possible embodiment of the present disclosure, the related information about the WUS may include at least one of an orthogonal cover code of a sequence of the WUS, a cyclic shift of the sequence of the WUS, a root sequence of the sequence of the WUS, and a scrambled sequence of the sequence of the WUS.

According to the network side device in the embodiments of the present disclosure, the network side device may receive the change information for requesting the change of the transmission mode from the UE, so that the network side device determines the transmission mode capable of being executed currently by the UE in accordance with the change information. As a result, it is able to, on one hand, change the transmission mode of the UE accurately, reduce the unnecessary power consumption for the UE and achieve a power-saving effect, and on the other hand, ensure the data transmission performance of a system.

In another possible embodiment of the present disclosure, the network side device 1300 may further include a computer program stored in the memory 1303 and executed by the processor 1301. The processor 1301 is configured to execute the computer program, so as to transmit a target transmission mode to a UE, so that the UE sets the target transmission mode as a current transmission mode.

In a possible embodiment of the present disclosure, the processor 1301 is further configured to execute the computer program stored in the memory 1301, so as to, prior to transmitting the target transmission mode to the UE, determine the target transmission mode in accordance with transmission mode influencing factors.

In a possible embodiment of the present disclosure, the target transmission mode may be transmitted through one of physical layer signaling, MAC signaling, RRC signaling, and a WUS.

According to the network side device in the embodiments of the present disclosure, when the UE needs to change the transmission mode, the network side device may transmit, on its own initiative, the target transmission mode to the UE, so that the UE sets the target transmission mode as the current transmission mode. As a result, it is able to, on one hand, change the transmission mode of the UE accurately, reduce the unnecessary power consumption for the UE and achieve a power-saving effect, and on the other hand, ensure the data transmission performance of a system.

In FIG. 13, bus architecture may include a number of buses and bridges connected to each other, so as to connect various circuits for one or more processors 1301 and one or more memories 1303. In addition, as is known in the art, the bus architecture may be used to connect any other circuits, such as a circuit for a peripheral device, a circuit for a voltage stabilizer and a power management circuit. The bus interface may be provided, and the transceiver 1302 may consist of a plurality of elements, i.e., a transmitter and a receiver for communication with any other devices over a transmission medium. With respect to different UEs, a user interface 1304 may also be provided for devices which are to be arranged inside or outside the UE, and these devices may include but not limited to a keypad, a display, a speaker, a microphone and a joystick.

The processor 1301 may take charge of managing the bus architecture as well as general processings. The memory 1303 may store therein data for the operation of the processor 1301.

The network side device 1300 is capable of implementing the procedures of the above-mentioned network side device with a same technical effect, which will not be particularly repeated herein.

Corresponding to the above-mentioned transmission mode determination methods, the present disclosure further provides in some embodiments a computer-readable storage medium storing therein a computer program. The computer program is executed by a processor, so as to implement the above-mentioned transmission mode determination methods with a same technical effect, which will not be particularly repeated herein. The computer-readable storage medium may be, for example, an ROM, an RAM, a magnetic disk or an optical disk.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, compact disc-read only memory (Compact Disc-Read Only Memory, CD-ROM) and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicated computer, an embedded processor or any other programmable data processing devices to create a machine, so that instructions capable of being executed by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

In a typical configuration, a computing device may include one or more central processing units (Central Processing Units, CPUs), an input/output interface, a network interface and a memory.

The memory may include an impermanent memory, an RAM and/or a non-volatile memory in the computer-readable storage medium, e.g., an ROM or a flash RAM. The memory may be an example of the computer-readable storage medium.

The computer-readable storage medium may include volatile or non-volatile, mobile or immobile storage medium capable of storing therein information using any method or technique. The information may be a computer-readable instruction, a data structure, a program or any other data. The computer-readable storage medium may include, but not limited to, an RAM (e.g., phase change random access memory (Phase Change Random Access Memory, PRAM), SRAM or DRAM, an ROM (e.g., an EEPROM, a flash memory, a CD-ROM or a digital video disk (Digital Video Disk, DVD)), a magnetic storage device (e.g., a cassette magnetic tape or a magnetic disk), or any other non-transmission medium capable of storing therein information which can be accessed by a computing device. As defined in the present disclosure, the computer-readable storage medium may not include any transitory media, e.g., modulated data signal or carrier.

It should be appreciated that, the embodiments of the present disclosure may be implemented by hardware, software, firmware, middleware, microcode or a combination thereof. For the hardware implementation, the processor may include one or more of an ASIC, a digital signal processor (Digital Signal Processor, DSP), a DSP device (DSPD), a programmable logic device (Programmable Logic Device, PLD), an FPGA, a general-purpose processor, a controller, a microcontroller, a microprocessor, any other electronic unit capable of achieving the functions in the present disclosure, or a combination thereof.

For the software implementation, the scheme in the embodiments of the present disclosure may be implemented through modules capable of achieving the functions in the present disclosure (e.g., processes or functions). Software codes may be stored in the memory and executed by the processor. The memory may be implemented inside or outside the processor.

Such words as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

Through the above-mentioned description, it may be apparent for a person skilled in the art that the present disclosure may be implemented by software as well as a necessary common hardware platform, or by hardware, and the former may be better in most cases. Based on this, the technical solutions of the present disclosure, partial or full, or parts of the technical solutions of the present disclosure contributing to the related art, may appear in the form of software products, which may be stored in a storage medium (e.g., ROM/RAM, magnetic disk or optical disk) and include several instructions so as to enable a terminal device (mobile phone, computer, server, or network device) to execute the method in the embodiments of the present disclosure.

The present disclosure has been described hereinabove in conjunction with the drawings and embodiments. The embodiments are for illustrative purposes only, but shall not be used to limit the scope of the present disclosure. In light of the present disclosure, a person skilled in the art may make various modifications and alterations without departing from the spirit of the present disclosure and the scope defined by the appended claims. Any modifications, equivalents or improvements made within the scope of the spirit and principle of the present disclosure shall be subject to the scope of the appended claims.

What is claimed is:

1. A transmission mode determination method performed by a User Equipment (UE), comprising:
transmitting change information about power saving of the UE to a network side device, wherein the change information about power saving of the UE is used to indicate a desired transmission mode about power saving of the UE, wherein the desired transmission mode about power saving of the UE is associated with a target Bandwidth Part (BWP) of a serving cell; and
wherein the desired transmission mode about power saving of the UE comprises at least one of the number of reception antennae, the number of transmission antennae, the number of reception antenna ports, the number of transmission antenna ports, the number of reception chains, the number of transmission chains, the maximum layers of downlink and the maximum layers of uplink, and values thereof.

2. The transmission mode determination method according to claim 1, wherein subsequent to transmitting the change information to the network side device, the transmission mode determination method further comprises:
receiving feedback information from the network side device; and setting a transmission mode indicated in the feedback information as a current transmission mode,
wherein the feedback information is transmitted through one of physical layer signaling, Media Access Control (MAC) signaling, Radio Resource Control (RRC) signaling and a Wake Up Signal (WUS).

3. The transmission mode determination method according to claim 2, wherein the feedback information is used to indicate whether the desired transmission mode is allowed, or indicate a target transmission mode.

4. The transmission mode determination method according to claim 3, wherein the setting the transmission mode indicated in the feedback information as the current transmission mode comprises:
when the feedback information indicates that the desired transmission mode is allowed, setting the desired transmission mode as the current transmission mode;
when the feedback information indicates that the desired transmission mode is not allowed, maintaining the current transmission mode; and
when the feedback information indicates the target transmission mode, setting the target transmission mode as the current transmission mode.

5. The transmission mode determination method according to claim 1, wherein prior to transmitting the change information to the network side device, the transmission mode determination method further comprises:
determining the desired transmission mode in accordance with transmission mode influencing factors,
wherein the transmission mode influencing factors comprise at least one of a remaining battery of the UE, an overheating indication of the UE, an attribute of an uplink service, and an attribute of a downlink service.

6. The transmission mode determination method according to claim 2, further comprising, upon the receipt of the feedback information, reporting channel-related parameters to the network side device in accordance with the transmission mode indicated in the feedback information, wherein the channel-related parameters comprise at least one of a Channel Quality Indicator (CQI), a Rank Indication (RI), a Precoding Matrix Indicator (PMI), and a Layer Indicator (LI), or
wherein subsequent to setting the transmission mode indicated in the feedback information as the current transmission mode, the transmission mode determination method further comprises:
when the transmission mode corresponding to scheduling signaling from the network side device is different from the transmission mode indicated in the feedback information, ignoring the scheduling signaling from the network side, wherein the scheduling signaling comprises signaling for scheduling downlink data or signaling for scheduling uplink data.

7. The transmission mode determination method according to claim 1, wherein the desired transmission mode is further associated with the serving cell.

8. The transmission mode determination method according to claim 1, further comprising:
transmitting at least one of a remaining battery of the UE, an overheating indication of the UE, an attribute of the uplink service and an attribute of the downlink service to the network side device.

9. The transmission mode determination method according to claim 2, wherein the setting the transmission mode indicated in the feedback information as the current transmission mode comprises:
when the feedback information is transmitted through the WUS, determining the transmission mode indicated in the feedback information in accordance with related information about the WUS and a predetermined correspondence, the predetermined correspondence comprising a correspondence between the related information about the WUS and transmission modes; and
setting the transmission mode indicated in the feedback information as the current transmission mode,
wherein the related information about the WUS comprises at least one of an orthogonal cover code of a sequence of the WUS, a cyclic shift of the sequence of the WUS, a root sequence of the sequence of the WUS, and a scrambled sequence of the sequence of the WUS.

10. A transmission mode determination method performed by a network side device, comprising:
receiving change information about power saving of a User Equipment (UE) from the UE, wherein the change information about power saving of the UE is used to indicate a desired transmission mode about power saving of the UE, wherein the desired transmission mode about power saving of the UE is associated with a target Bandwidth Part (BWP) of a serving cell; and
wherein the desired transmission mode about power saving of the UE comprises at least one of the number of reception antennae, the number of transmission antennae, the number of reception antenna ports, the number of transmission antenna ports, the number of reception chains, the number of transmission chains, the maximum layers of downlink and the maximum layers of uplink, and values thereof.

11. The transmission mode determination method according to claim 10, wherein subsequent to receiving the change information from the UE, the transmission mode determination method further comprises:
determining feedback information in accordance with the change information; and transmitting the feedback information to the UE, so that the UE sets a transmission mode indicated in the feedback information as a current transmission mode.

12. The transmission mode determination method according to claim 11, wherein the feedback information is used to indicate whether the desired transmission mode is allowed, or indicate a target transmission mode.

13. The transmission mode determination method according to claim 11, wherein the determining the feedback information in accordance with the change information comprises:
determining the feedback information in accordance with the change information and transmission mode influencing factors.

14. The transmission mode determination method according to claim 13, wherein the transmission mode influencing factors comprise at least one of a remaining battery of the UE, an overheating indication of the UE, an attribute of an uplink service, and an attribute of a downlink service.

15. The transmission mode determination method according to claim 11, wherein the desired transmission mode is further associated with the serving cell.

16. The transmission mode determination method according to claim 11, further comprising:
receiving at least one of a remaining battery of the UE, an overheating indication of the UE, an attribute of the uplink service and an attribute of the downlink service from the UE.

17. The transmission mode determination method according to claim 11, wherein the feedback information is transmitted through one of physical layer signaling, Media Access Control (MAC) signaling, Radio Resource Control (RRC) signaling and a Wake Up Signal (WUS).

18. The transmission mode determination method according to claim 17, wherein when the WUS is transmitted through the feedback information, a predetermined correspondence is provided between related information about the WUS and transmission modes, so that the UE determines the transmission mode indicated in the feedback information in accordance with the related information about the WUS and the predetermined correspondence,
wherein the related information about the WUS comprises at least one of an orthogonal cover code of a sequence of the WUS, a cyclic shift of the sequence of the WUS, a root sequence of the sequence of the WUS, and a scrambled sequence of the sequence of the WUS.

19. A User Equipment (UE), comprising a memory, a processor, and a computer program stored in the memory and executed by the processor, wherein the processor is configured to execute the computer program so as to implement a transmission mode determination method for the UE, comprising:
transmitting change information about power saving of the UE to a network side device, wherein the change information about power saving of the UE is used to indicate a desired transmission mode about power saving of the UE, wherein the desired transmission mode about power saving of the UE is associated with a target Bandwidth Part (BWP) of a serving cell; and
wherein the desired transmission mode about power saving of the UE comprises at least one of the number of reception antennae, the number of transmission antennae, the number of reception antenna ports, the number of transmission antenna ports, the number of reception chains, the number of transmission chains, the maximum layers of downlink and the maximum layers of uplink, and values thereof.

20. A network side device, comprising a memory, a processor, and a computer program stored in the memory and executed by the processor, wherein the processor is configured to execute the computer program so as to implement the transmission mode determination method according to claim 10.

* * * * *